(12) United States Patent
Takahashi et al.

(10) Patent No.: US 7,039,746 B2
(45) Date of Patent: May 2, 2006

(54) INTERFACE CIRCUIT, DISC CONTROLLER, DISC DRIVE APPARATUS AND INTERFACE CONTROL METHOD

(75) Inventors: Yoshihisa Takahashi, Osaka (JP); Motoshi Ito, Osaka (JP); Yoshikazu Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 10/726,153

(22) Filed: Dec. 2, 2003

(65) Prior Publication Data

US 2004/0177183 A1  Sep. 9, 2004

(30) Foreign Application Priority Data

Dec. 3, 2002  (JP) .............................. 2002-351065

(51) Int. Cl.
*G06F 13/36* (2006.01)
(52) U.S. Cl. ...................... 710/306; 710/313
(58) Field of Classification Search ................ 710/100, 710/305–306, 313–315
See application file for complete search history.

(56) References Cited

FOREIGN PATENT DOCUMENTS

JP  2001-325204  11/2001

*Primary Examiner*—Tim Vo
(74) *Attorney, Agent, or Firm*—RatnerPrestia

(57) ABSTRACT

An interface circuit includes an interface communication section for performing communication with an upstream device; a system interface communication section for performing communication with a system controller; and an interface control section for controlling these sections. The interface control section includes a section for executing first reset processing; a section for requesting the system interface communication section to request the system controller to permit execution of second reset processing different from the first reset processing; a section for requesting the system interface communication section to receive a report of the permission of the execution of the second reset processing from the system controller; a section for executing the second reset processing in accordance with the report of the permission of the execution of the second reset processing; and a section for requesting the interface communication section to report completion of the second reset processing to the upstream device.

104 Claims, 16 Drawing Sheets

* "–" means "arbitrary"

FIG.15

| Byte position | 0 | 1 | 2 | 3 | 4 | 5 | 6 | 7 | 8 | 9 | 10 | 11 |
|---|---|---|---|---|---|---|---|---|---|---|---|---|
| Parameter code | 0x12 | 0x00 | 0x00 | 0x00 | 0x40 | 0x00 | 0x00 | 0x00 | 0x00 | 0x00 | 0x00 | 0x00 | even
INTERFACE CIRCUIT, DISC CONTROLLER, DISC DRIVE APPARATUS AND INTERFACE CONTROL METHOD

BACKGROUND OF THE INVENTION

1. Field of the Invention

The present invention relates to an interface circuit for performing communication with an upstream device and with a system controller, a disc controller including such an interface circuit, a disc drive apparatus including such an interface circuit, and an interface control method. The system controller is provided for controlling the disc drive apparatus.

2. Description of the Related Art

Recently, optical disc drive apparatuses (for example, DVD-RAM drives) are used as memory devices mounted on personal computer systems, DVD recorder systems and the like.

As a host interface for connecting an optical disc drive apparatus and a host device, an IDE interface is well known. Especially today, an ATA/ATAPI interface (hereinafter, referred to also as the "ATAPI interface") is well known, which has been standardized by the American National Standards Institute (ANSI) and is being standardized by the Technical Committee TB13. The ATA (AT attachment) is a standard for connection of a hard disc, and ATAPI (ATA Packet Interface) is a standard for connection of an assisting memory device other than the hard disc, such as a DVD-RAM drive or the like.

The ATAPI interface includes a register, from which data can be read and to which data can be written by, for example, (i) an optical disc controlling microcomputer (hereinafter, referred to as the "optical disc controller" or "ODC") included in a drive apparatus or the like, or a system controlling microcomputer (hereinafter, referred to as the "system controller") for controlling the entirety of elements included in an optical disc drive apparatus, and (ii) also by a host device. This register is referred to as a task file register (or an ATA register).

Today, new products used for optical disc drive apparatuses (for example, DVD-RAM drives) are marketed substantially every year. Corporations and engineers who develop optical disc drive apparatuses wish to accelerate the speed of development of the optical disc drive apparatuses and produce and market new products of optical disc drive apparatuses as rapidly as possible. They especially wish to increase the speed of development of system controllers for the purpose of increasing the speed of development of the optical disc drive apparatuses. Engineers involved in developing system controllers wish to reduce the load of development of system controllers, which requires each element of LSI hardware (for example, optical disc controllers) controlled by the system controllers to have more diverse functions.

One means for increasing the, speed of development of system controllers is to have LSI hardware (e.g., optical disc controllers) perform control processing, which is conventionally performed by system controllers. In this way, the number of steps for developing the system controllers is reduced.

Such processing, which is conventionally performed by the system controllers and is to be performed by the LSI hardware, is desired to be common between corporations (for example, to be made uniform by a standard) in consideration of sales of LSI.

One example of processing made uniform by a standard is made uniform by "Information Technology AT Attachment with Packet Interface-6 (ATA/ATAPI-6)", which is a standard of the ATA/ATAPI interface. Hereinafter, ATA/ATAPI-6 will be referred to as the "ATAPI Standard". The ATAPI Standard defines various types of processing as protocols.

The ATAPI Standard protocol processing is conventionally performed by system controllers despite being made uniform by the Standard.

Under the circumstances, a method for performing the conventional ATAPI Standard protocol processing using LSI hardware such as optical disc controllers instead of system controllers is proposed (see, for example, Japanese Laid-Open Publication No. 2001-325204).

According to the method for performing the conventional ATAPI Standard protocol processing described in Japanese Laid-Open Publication No. 2001-325204, control processing, which is conventionally performed by a system controller (for example, processing for setting registers for a host interface including a task file register or the like), is executed by an optical disc controller acting as LSI hardware.

The processing for setting registers is, more specifically, for example, processing for setting a task file register, such as an error register or a status register. Such processing is performed in order to notify the host device of a command execution result. Such processing, which is conventionally performed by a system controller as processing as a command issued by the host device, is executed by an optical disc controller acting as LSI hardware.

This releases the engineers involved in developing system controllers from the work of development regarding the ATAPI Standard protocol processing, which is conventionally executed by the system controllers, and alleviates the load on system controller development.

However, the method described in Japanese Laid-Open Publication No. 2001-325204 has the following problem. Since the ATAPI Standard protocol processing is executed via the LSI hardware, the system controller cannot directly access the ATAPI interface. Thus, for example, the customization of the interface circuit, which is conventionally performed using the system controller, for controlling LSI hardware as an operation inherent in the drive, by directly setting the registers in the ATAPI interface, becomes very difficult. Although the load of development of system controllers is reduced, the efficiency of development of system controllers is deteriorated.

The optical disc controller described in Japanese Laid-Open Publication No. 2001-325204 can automatically execute the ATAPI Standard protocol processing, but it is very difficult for such an optical disc controller to execute customization using the system controllers.

SUMMARY OF THE INVENTION

According to one aspect of the invention, an interface circuit for performing communication with an upstream device and with a system controller f or controlling a disc drive apparatus is provided. The interface circuit includes an interface communication section for performing communication with the upstream device; a system interface communication section for performing communication with the system controller; and an interface control section for controlling the interface communication section and the system interface communication section. The interface control section includes (a) a first execution section for executing first reset processing; (b) a first request section for requesting the system interface communication section to request the system controller to permit execution of second reset processing which is different from the first reset processing; (c) a second request section for requesting the system interface communication section to receive a report of the permission of the execution of the second reset processing from the system controller; (d) a second execution section for executing the second reset processing in accordance with the report of the permission of the execution of the second reset processing; and (e) a third request section for requesting the interface communication section to report completion of the second reset processing to the upstream device.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to another aspect of the invention, a disc controller includes a disc recording and reproduction control section for performing data recording to and data reproduction from a disc; and an interface circuit for performing communication with an upstream device and with a system controller for controlling a disc drive apparatus. The interface circuit includes an interface communication section for performing communication with the upstream device; a system interface communication section for performing communication with the system controller; and an interface control section for controlling the interface communication section and the system interface communication section. The interface control section includes (a) a first execution section for executing first reset processing; (b) a first request section for requesting the system interface communication section to request the system controller to permit execution of second reset processing which is different from the first reset processing; (c) a second request section for requesting the system interface communication section to receive a report of the permission of the execution of the second reset processing from the system controller; (d) a second execution section for executing the second reset processing in accordance with the report of the permission of the execution of the second reset processing; and (e) a third request section for requesting the interface communication section to report completion of the second reset processing to the upstream device.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to still another aspect of the invention, a disc drive apparatus includes an interface circuit for performing communication with an upstream device and with a system controller; and the system controller. The interface circuit includes an interface communication section for performing communication with the upstream device; a system interface communication section for performing communication with the system controller; and an interface control section for controlling the interface communication section and the system interface communication section. The interface control section includes (a) a first execution section for executing first reset processing; (b) a first request section for requesting the system interface communication section to request the system controller to permit execution of second reset processing which is different from the first reset processing; (c) a second request section for requesting the system interface communication section to receive a report of the permission of the execution of the second reset processing from the system controller; (d) a second execution section for executing the second reset processing in accordance with the report of the permission of the execution of the second reset processing; and (e) a third request section for requesting the interface communication section to report completion of the second reset processing to the upstream device. The system controller reports the permission of the execution of the second reset processing to the interface circuit.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to still another aspect of the invention, a disc drive apparatus includes a disc controller; and a system controller. The disc controller includes a disc recording and reproduction control section for performing data recording to and data reproduction from a disc; and an interface circuit for performing communication with an upstream device and with a system controller. The interface circuit includes an interface communication section for performing communication with the upstream device; a system interface communication section for performing communication with the system controller; and an interface control section for controlling the interface communication section and the system interface communication section. The interface control section includes (a) a first execution section for executing first reset processing; (b) a first request section for requesting the system interface communication section to request the system controller to permit execution of second reset processing which is different from the first reset processing; (c) a second request section for requesting the system interface communication section to receive a report of the permission of the execution of the second reset processing from the system controller; (d) a second execution section for executing the second reset processing in accordance with the report of the permission of the execution of the second reset processing; and (e) a third request section for requesting the interface communication section to report completion of the second reset processing to the upstream device. The system controller reports the permission of the execution of the second reset processing to the interface circuit.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to still another aspect of the invention, an interface control method, in an interface circuit for performing communication with an upstream device and with a system controller for controlling a disc drive apparatus, for controlling an interface communication section for performing communication with the upstream device and a system interface communication section for performing communication with the system controller, is provided. The interface control method includes the steps of (a) executing first reset processing; (b) requesting the system interface communication section to request the system controller to permit execution of second reset processing which is different from the first reset processing; (c) requesting the system interface communication section to receive a report of the permission of the execution of the second reset processing from the system controller; (d) executing the second reset processing in accordance with the report of the permission of the execution of the second reset processing; and (e) requesting the interface communication section to report completion of the second reset processing to the upstream device.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to still another aspect of the invention, an interface control method, in a disc controller including a disc recording and reproduction control section for performing data recording to and data reproduction from a disc, and an interface circuit for performing communication with an upstream device and with a system controller for controlling a disc drive apparatus, for controlling an interface communication section for performing communication with the upstream device and a system interface communication section for performing communication with the system controller, is provided. The interface control method includes the steps of (a) executing first reset processing; (b) requesting the system interface communication section to request the system controller to permit execution of second reset processing which is different from the first reset processing; (c) requesting the system interface communication section to receive a report of the permission of the execution of the second reset processing from the system controller; (d) executing the second reset processing in accordance with the report of the permission of the execution of the second reset processing; and (e) requesting the interface communication section to report completion of the second reset processing to the upstream-device.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to still another aspect of the invention, an interface control method, in a disc drive apparatus including an interface circuit for performing communication with an upstream device and with a system controller, and the system controller, for controlling an interface communication section for performing communication with the upstream device and a system interface communication section for performing communication with the system controller, is provided. The interface control method includes the steps of (a) executing first reset processing; (b) requesting the system interface communication section to request the system controller to permit execution of second reset processing which is different from the first reset processing; (c) reporting the permission of the execution of the second reset processing to the interface circuit; (d) requesting the system interface communication section to receive a report of the permission of the execution of the second reset processing from the system controller; (e) executing the second reset processing in accordance with the report of the permission of the execution of the second reset processing; and (f) requesting the interface communication section to report completion of the second reset processing to the upstream device. The system controller reports the permission of the execution of the second reset processing to the interface circuit.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to still another aspect of the invention, an interface control method, in a disc drive apparatus including a disc controller and a system controller, for controlling an interface communication section for performing communication with an upstream device and with a system interface communication section for performing communication with the system controller is provided. The disc controller includes a disc recording and reproduction control section for performing data recording to and data reproduction from a disc; and an interface circuit for performing communication with the upstream device and the system controller. The interface control method includes the steps of (a) executing first reset processing; (b) requesting the system interface communication section to request the system controller to permit execution of second reset processing which is different from the first reset processing; (c) reporting the permission of the execution of the second reset processing to the interface circuit; (d) requesting the system interface communication section to receive a report of the permission of the execution of the second reset processing from the system controller; (e) executing the second reset processing in accordance with the report of the permission of the execution of the second reset processing; and (f) requesting the interface communication section to report completion of the second reset processing to the upstream device. The system controller reports the permission of the execution of the second reset processing to the interface circuit.

In one embodiment of the invention, the interface communication section performs communication with the upstream device via a bus.

In one embodiment of the invention, the bus is an ATA/ATAPI bus, the interface communication section is an ATA/ATAPI task file register, and the interface circuit is an ATA/ATAPI interface circuit.

In one embodiment of the invention, the first reset processing does not include prescribed processing on self-diagnostic testing, the second reset processing includes the prescribed processing on self-diagnostic testing, and the self-diagnostic testing is processing for detecting an abnormality inside the disc drive apparatus.

According to still another aspect of the invention, an interface circuit for performing communication with an upstream device and with a system controller for controlling a disc drive apparatus is provided. The interface circuit includes a host data transfer section for performing data transfer with the upstream device; a buffer data transfer section for performing data transfer with a data buffer; a system interface communication section for performing communication with the system controller; and an interface control section for controlling the host data transfer section, the buffer data transfer section, and the system interface communication section. The data buffer stores data. The system controller requests the interface circuit to perform data transfer between the upstream device and the data buffer. The interface control section includes (a) a first request section for requesting the host data transfer section to perform data transfer between the upstream device and the host data transfer section in accordance with the request from the system controller to perform data transfer between the upstream device and the data buffer; (b) a second request section for requesting the buffer data transfer section to perform data transfer between the data buffer and the buffer data transfer section in accordance with the request from the system controller to perform data transfer between the upstream device and the data buffer; and (c) a determination section for determining whether the data transfer between the upstream device and the data buffer has been completed or not based on a report from the host data transfer section on the data transfer and a report from the buffer data transfer section on the data transfer.

In one embodiment of the invention, the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the determination section determines that the data transfer between the upstream device and the data buffer has been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, a disc controller includes a disc recording and reproduction control section for performing data recording to and data reproduction from a disc; and an interface circuit for performing communication with an upstream device and with a system controller for controlling a disc drive apparatus. The interface circuit includes a host data transfer section for performing data transfer with the upstream device; a buffer data transfer section for performing data transfer with a data buffer; a system interface communication section for performing communication with the system controller; and an interface control section for controlling the host data transfer section, the buffer data transfer section, and the system interface communication section. The data buffer stores data. The system controller requests the interface circuit to perform data transfer between the upstream device and the data buffer. The interface control section includes (a) a first request section for requesting the host data transfer section to perform data transfer between the upstream device and the host data transfer section in accordance with the request from the system controller to perform data transfer between the upstream device and the data buffer; (b) a second request section for requesting the buffer data transfer section to perform data transfer between the data buffer and the buffer data transfer section in accordance with the request from the system controller to perform data transfer between the upstream device and the data buffer; and (c) a determination section for determining whether the data transfer between the upstream device and the data buffer has been completed or not based on a report from the host data transfer section on the data transfer and a report from the buffer data transfer section on the data transfer.

In one embodiment of the invention, the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the determination section determines that the data transfer between the upstream device and the data buffer has been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, a disc drive apparatus includes an interface circuit for performing communication with an upstream device and with a system controller; a data buffer capable of storing data; and the system controller. The interface circuit includes a host data transfer section for performing data transfer with the upstream device; a buffer data transfer section for performing data transfer with the data buffer; a system interface communication section for performing communication with the system controller; and an interface control section for controlling the host data transfer section, the buffer data transfer section, and the system interface communication section. The system controller requests the interface circuit to perform data transfer between the upstream device and the data buffer. The interface control section includes (a) a first request section for requesting the host data transfer section to perform data transfer between the upstream device and the host data transfer section in accordance with the request from the system controller to perform data transfer between the upstream device and the data buffer; (b) a second request section for requesting the buffer data transfer section to perform data transfer between the data buffer and the buffer data transfer section in accordance with the request from the system controller to perform data transfer between the upstream device and the data buffer; and (c) a determination section for determining whether the data transfer between the upstream device and the data buffer has been completed or not based on a report from the host data transfer section on the data transfer and a report from the buffer data transfer section on the data transfer.

In one embodiment of the invention, the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the determination section determines that the data transfer between the upstream device and the data buffer has been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, a disc drive apparatus includes a disc controller; a data buffer capable of storing data; and a system controller. The disc controller includes a disc recording and reproduction control section for performing data recording to and data reproduction from a disc; and an interface circuit for performing communication with an upstream device and with a system controller. The interface circuit includes a host data transfer section for performing data transfer with the upstream device; a buffer data transfer section for performing data transfer with the data buffer; a system interface communication section for performing communication with the system controller; and an interface control section for controlling the host data transfer section, the buffer data transfer section, and the system interface communication section. The system controller requests the interface circuit to perform data transfer between the upstream device and the data buffer. The interface control section includes (a) a first request section for requesting the host data transfer section to perform data transfer between the upstream device and the host data transfer section in accordance with the request from the system controller to perform data transfer between the upstream device and the data buffer; (b) a second request section for requesting the buffer data transfer section to perform data transfer between the data buffer and the buffer data transfer section in accordance with the request from the system controller to perform data transfer between the upstream device and the data buffer; and (c) a determination section for determining whether the data transfer between the upstream device and the data buffer has been completed or not based on a report from the host data transfer section on the data transfer and a report from the buffer data transfer section on the data transfer.

In one embodiment of the invention, the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the determination section determines that the data transfer between the upstream device and the data buffer has been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, an interface control method, in an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller is provided. The data buffer stores data. The system controller requests the interface circuit to perform data transfer between the upstream device and the data buffer. The interface control method includes the steps of (a) requesting the host data transfer section to perform data transfer between the upstream device and the host data transfer section in accordance with the request from the system controller to perform data transfer between the upstream device and the data buffer; (b) requesting the buffer data transfer section to perform data transfer between the data buffer and the buffer data transfer section in accordance with the request from the system controller to perform data transfer between the upstream device and the data buffer; and (c) determining whether the data transfer between the upstream device and the data buffer has been completed or not based on a report from the host data transfer section on the data transfer and a report from the buffer data transfer section on the data transfer.

In one embodiment of the invention, the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the data transfer between the upstream device and the data buffer is determined to have been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, an interface control method, in a disc controller including a disc recording and reproduction control section for performing data recording to and data reproduction from a disc, and an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller is provided. The data buffer stores data. The system controller requests the interface circuit to perform data transfer between the upstream device and the data buffer. The interface control method includes the steps of (a) requesting the host data transfer section to perform data transfer between the upstream device and the host data transfer section in accordance with the request from the system controller to perform data transfer between the upstream device and the data buffer; (b) requesting the buffer data transfer section to perform data transfer between the data buffer and the buffer data transfer section in accordance with the request from the system controller to perform data transfer between the upstream device and the data buffer; and (c) determining whether the data transfer between the upstream device and the data buffer has been completed or not based on a report from the host data transfer section on the data transfer and a report from the buffer data transfer section on the data transfer.

In one embodiment of the invention, the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the data transfer between the upstream device and the data buffer is determined to have been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, an interface control method, in a disc drive apparatus including an interface circuit for performing communication with an upstream device and with a system controller, a data buffer capable of storing data, and the system controller, for controlling a host data transfer section for performing data transfer with the upstream device, a buffer data transfer section for performing data transfer with the data buffer, and a system interface communication section for performing communication with the system controller is provided. The system controller requests the interface circuit to perform data transfer between the upstream device and the data buffer. The interface control method includes the steps of (a) requesting data transfer between the upstream device and the data buffer; (b) requesting the host data transfer section to perform data transfer between the upstream device and the host data transfer section in accordance with the request from the system controller to perform data transfer between the upstream device and the data buffer; (c) requesting the buffer data transfer section to perform data transfer between the data buffer and the buffer data transfer section in accordance with the request from the system controller to perform data transfer between the upstream device and the data buffer; and (d) determining whether the data transfer between the upstream device and the data buffer has been completed or not based on a report from the host data transfer section on the data transfer and a report from the buffer data transfer section on the data transfer.

In one embodiment of the invention, the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the data transfer between the upstream device and the data buffer is determined to have been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, an interface control method, in a disc drive apparatus including a disc controller, a data buffer capable of storing data, and a system controller, for controlling a host data transfer section for performing data transfer with the upstream device, and a buffer data transfer section for performing data transfer with the data buffer is provided. The disc controller includes a disc recording and reproduction control section for performing data recording to and data reproduction from a disc; and an interface circuit for performing communication with the upstream device and the system controller. The system controller requests the interface circuit to perform data transfer between the upstream device and the data buffer. The interface control method includes the steps of (a) requesting data transfer between the upstream device and the data buffer; (b) requesting the host data transfer section to perform data transfer between the upstream device and the host data transfer section in accordance with the request from the system controller to perform data transfer between the upstream device and the data buffer; (c) requesting the buffer data transfer section to perform data transfer between the data buffer and the buffer data transfer section in accordance with the request from the system controller to perform data transfer between the upstream device and the data buffer; and (d) determining whether the data transfer between the upstream device and the data buffer has been completed or not based on a report from the host data transfer section on the data transfer and a report from the buffer data transfer section on the data transfer.

In one embodiment of the invention, the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer. When the data transfer between the upstream device and the host data transfer section has been completed and the data transfer between the data buffer and the buffer data transfer section has been completed, the data transfer between the upstream device and the data buffer is determined to have been completed.

In one embodiment of the invention, the host data transfer section performs data transfer with the upstream device via a bus.

In one embodiment of the invention, the bus is an ATA/ATAPI bus, and the interface circuit is an ATA/ATAPI interface circuit.

According to still another aspect of the invention, an interface circuit for performing communication with an upstream device and with a system controller for controlling a disc drive apparatus is provided. The interface circuit includes a host data transfer section for performing data transfer with the upstream device; a buffer data transfer section for performing data transfer with a data buffer; a system interface communication section for performing communication with the system controller; and an interface control section for controlling the host data transfer section, the buffer data transfer section, and the system interface communication section. The data buffer stores data. The system controller requests the interface circuit to update the data stored in the data buffer and transfer the updated data to the upstream device. The interface control section includes (a) a first request section for updating the data stored in the data buffer in accordance with the request from the system controller to update the data; (b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, a disc controller includes a disc recording and reproduction control section for performing data recording to and data reproduction from a disc; and an interface circuit for performing communication with an upstream device and with a system controller for controlling a disc drive apparatus. The interface circuit includes a host data transfer section for performing data transfer with the upstream device; a buffer data transfer section for performing data transfer with a data buffer; a system interface communication section for performing communication with the system controller; and an interface control section for controlling the host data transfer section, the buffer data transfer section, and the system interface communication section. The data buffer stores data. The system controller requests the interface circuit to update the data stored in the data buffer and transfer the updated data to the upstream device. The interface control section includes (a) a first request section for updating the data stored in the data buffer in accordance with the request from the system controller to update the data; (b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, a disc drive apparatus includes an interface circuit for performing communication with an upstream device and with a system controller; a data buffer capable of storing data; and the system controller. The interface circuit includes a host data transfer section for performing data transfer with the upstream device; a buffer data transfer section for performing data transfer with the data buffer; a system interface communication section for performing communication with the system controller; and an interface control section for controlling the host data transfer section, the buffer data transfer section, and the system interface communication section. The system controller requests the interface circuit to update the data stored in the data buffer and transfer the updated data to the upstream device. The interface control section includes (a) a first request section for updating the data stored in the data buffer in accordance with the request from the system controller to update the data; (b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, a disc drive apparatus includes a disc controller; a data buffer capable of storing data; and a system controller. The disc controller includes a disc recording and reproduction control section for performing data recording to and data reproduction from a disc; and an interface circuit for performing communication with an upstream device and with a system controller. The interface circuit includes a host data transfer section for performing data transfer with the upstream device; a buffer data transfer section for performing data transfer with the data buffer; a system interface communication section for performing communication with the system controller; and an interface control section for controlling the host data transfer section, the buffer data transfer section, and the system interface communication section. The system controller requests the interface circuit to update the data stored in the data buffer and transfer the updated data to the upstream device. The interface control section includes (a) a first request section for updating the data stored in the data buffer in accordance with the request from the system controller to update the data; (b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, an interface control method, in an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller is provided. The data buffer stores data. The system controller requests the interface circuit to update the data stored in the data buffer and transfer the updated data to the upstream device. The interface control method comprising the steps of (a) updating the data stored in the data buffer in accordance with the request from the system controller to update the data; (b) requesting the system interface communication section to report to the system controller that the update of the data has been completed; and (c) requesting the host data transfer section and the buffer data transfer section to transfer the updated data in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, an interface control method, in a disc controller including a disc recording and reproduction control section for performing data recording to and data reproduction from a disc, and an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller is provided. The data buffer stores data. The system controller requests the interface circuit to update the data stored in the data buffer and transfer the updated data to, the upstream device. The interface control method includes the steps of (a) updating the data stored in the data buffer in accordance with the request from the system controller to update the data; (b) requesting the system interface communication section to report to the system controller that the update of the data has been completed; and (c) requesting the host data transfer section and the buffer data transfer section to transfer the updated data in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, an interface control method, in a disc drive apparatus including an interface circuit for performing communication with an upstream device and with a system controller, a data buffer capable of storing data, and the system controller, for controlling a host data transfer section for performing data transfer with the upstream device, a buffer data transfer section for performing data transfer with the data buffer, and a system interface communication section for performing communication with the system controller is provided. The system controller requests the interface circuit to update the data stored in the data buffer and transfer the updated data to the upstream device. The interface control method includes the steps of (a) requesting the interface circuit to update the data stored in the data buffer; (b) updating the data stored in the data buffer in accordance with the request from the system controller to update the data; (c) requesting the system interface communication section to report to the system controller that the update of the data has been completed; (d) requesting the interface circuit to transfer the updated data to the upstream device; and (e) requesting the host data transfer section and the buffer data transfer section to transfer the updated data in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, an interface control method, in a disc drive apparatus including a disc controller, a data buffer capable of storing data, and a system controller, for controlling a host data transfer section for performing data transfer with the upstream device, a buffer data transfer section for performing data transfer with the data buffer, and a system interface communication section for performing communication with the system controller is provided. The disc controller includes a disc recording and reproduction control section for performing data recording to and data reproduction from a disc; and an interface circuit for performing communication with an upstream device and with the system controller. The system controller requests the interface circuit to update the data stored in the data buffer and transfer the updated data to the upstream device. The interface control method includes the steps of (a) requesting the interface circuit to update the data stored in the data buffer; (b) updating the data stored in the data buffer in accordance with the request from the system controller to update the data; (c) requesting the system interface communication section to report to the system controller that the update of the data has been completed; (d) requesting the interface circuit to transfer the updated data to the upstream device; and (e) requesting the host data transfer section and the buffer data transfer section to transfer the updated data to the upstream device in accordance with the request from the system controller to transfer the updated data to the upstream device.

In one embodiment of the invention, the host data transfer section performs data transfer with the upstream device via a bus.

In one embodiment of the invention, the data stored in the data buffer is device information data requested by the upstream device for identifying a device connected to the bus.

In one embodiment of the invention, the bus is an ATA/ATAPI bus, and the interface circuit is an ATA/ATAPI interface circuit.

According to still another aspect of the invention, an ATA/ATAPI interface circuit for performing communication with an upstream device and with a system controller for controlling a disc drive apparatus which is connected to an ATA/ATAPI bus as a master device is provided. The ATA/ATAPI interface circuit includes an ATA task file register for performing communication with the upstream device; a system interface communication section for performing communication with the system controller; a pseudo task file register operating instead of an ATA task file register included in a slave device corresponding to the master device; and an interface control section for controlling the ATA task file register, the interface communication section, and the pseudo task file register. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control section includes (a) a request section for requesting the system interface communication section to receive the operation method information reported by the system controller; and (b) a setting section for setting a value to be held by the pseudo task file register based on the operation method information. The value is a value regarding the operation method information.

According to still another aspect of the invention, a disc controller includes a disc recording and reproduction control section for performing data recording to and data reproduction from a disc; and an ATA/ATAPI interface circuit for performing communication with an upstream device and with a system controller for controlling a disc drive apparatus which is connected to an ATA/ATAPI bus as a master device. The ATA/ATAPI interface circuit includes an ATA task file register for performing communication with the upstream device; a system interface communication section for performing communication with the system controller; a pseudo task file register operating instead of an ATA task file register included in a slave device corresponding to the master device; and an interface control section for controlling the ATA task file register, the system interface communication section, and the pseudo task file register. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control section includes (a) a request section for requesting the system interface communication section to receive the operation method information reported by the system controller; and (b) a setting section for setting a value to be held by the pseudo task file register based on the operation method information. The value is a value regarding the operation method information.

According to still another aspect of the invention, a disc drive apparatus includes an ATA/ATAPI interface circuit for performing communication with an upstream device and with a system controller; and the system controller. The disc drive apparatus is connected to an ATA/ATAPI bus as a master device. The ATA/ATAPI interface circuit includes an ATA task file register for performing communication with the upstream device; a system interface communication section for performing communication with the system controller; a pseudo task file register operating instead of an ATA task file register included in a slave device corresponding to the master device; and an interface control section for controlling the ATA task file register, the system interface communication section, and the pseudo task file register. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control section includes (a) a request section for requesting the system interface communication section to receive the operation method information reported by the system controller; and (b) a setting section for setting a value to be held by the pseudo task file register based on the operation method information. The value is a value regarding the operation method information.

According to still another aspect of the invention, a disc drive apparatus includes a disc controller; and a system controller. The disc controller includes a disc recording and reproduction control section for performing data recording to and data reproduction from a disc; and an ATA/ATAPI interface circuit for performing communication with an upstream device and with a system controller. The disc drive apparatus is connected to an ATA/ATAPI bus as a master device. The ATA/ATAPI interface circuit includes an ATA task file register for performing communication with the upstream device; a system interface communication section for performing communication with the system controller; a pseudo task file register operating instead of an ATA task file register included in a slave device corresponding to the master device; and an interface control section for controlling the ATA task file register, the system interface communication section, and the pseudo task file register. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control section includes (a) a request section for requesting the system controller interface section to receive the operation method information reported by the system controller; and (b) a setting section for setting a value to be held by the pseudo task file register based on the operation method information. The value is a value regarding the operation method information.

According to still another aspect of the invention, an interface control method, in an ATA/ATAPI interface circuit for performing communication with an upstream device and with a system controller for controlling a disc drive apparatus which is connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device is provided. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control method includes the steps of (a) requesting the system interface communication section to receive the operation method information reported by the system controller; and (b) setting a value to be held by the pseudo task file register based on the operation method information. The value is a value regarding the operation method information.

According to still another aspect of the invention, an interface control method, in a disc controller including a disc recording and reproduction control section for performing data recording to and data reproduction from a disc, and an ATA/ATAPI interface circuit for performing communication with an upstream device and with a system controller for controlling a disc drive apparatus which is connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device is provided. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control method includes the steps of (a) requesting the system interface communication section to receive the operation method information reported by the system controller; and (b) setting a value to be held by the pseudo task file register based on the operation method information. The value is a value regarding the operation method information.

According to still another aspect of the invention, an interface control method, in a disc drive apparatus including an ATA/ATAPI interface circuit for performing communication with an upstream device and with a system controller, and the system controller, the disc drive apparatus being connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device is provided. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control method includes the steps of (a) reporting the operation method information to the ATA/ATAPI interface circuit; (b) requesting the system interface communication section to receive the operation method information reported by the system controller; and (c) setting a value to be held by the pseudo task file register based on the operation method information. The value is a value regarding the operation method information.

According to still another aspect of the invention, an interface control method, in a disc drive apparatus including a disc controller and a system controller, the disc drive apparatus being connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device is provided. The disc controller includes a disc recording and reproduction control section for performing data recording to and data reproduction from a disc; and an ATA/ATAPI interface circuit for performing communication with an upstream device and with a system controller. The upstream device is connected to the ATA/ATAPI bus. The system controller reports operation method information to the ATA/ATAPI interface circuit. The operation method information represents an operation performed by the master device when the upstream device attempts to access the slave device in a state where the slave device is not connected to the ATA/ATAPI bus. The interface control method includes the steps of (a) reporting the operation method information to the ATA/ATAPI interface circuit; (b) requesting the system interface communication section to receive the operation method information reported by the system controller; and (c) setting a value to be held by the pseudo task file register based on the operation method information. The value is a value regarding the operation method information.

Thus, the invention described herein makes possible the advantages of providing a section for realizing customization using a system controller so as to make it easy for realizing customization using a system controller and of providing an LSI (disc controller) capable of automatically executing the ATAPI Standard protocol processing.

These and other advantages of the present invention will become apparent to those skilled in the art upon reading and understanding the following detailed description with reference to the accompanying figures.

BRIEF DESCRIPTION OF THE DRAWINGS

FIG. 15 shows an example of an "Inquiry" command, which is data having 12 bytes.

DESCRIPTION OF THE PREFERRED EMBODIMENTS

Hereinafter, the present invention will be described by way of illustrative examples with reference to the accompanying drawings.

In the following examples, an optical disc drive apparatus will be described as an exemplary disc drive apparatus.

As a bus, an ATA/ATAPI bus will be used, and as an interface, an ATA/ATAPI interface will be used. An ATA/ATAPI interface includes a register from which data can be read and to which data can be written a hoist device. This register is referred to as a task file register (ATA register).

A hexadecimal number is represented by adding "0x" at the beginning of a numerical value. For example, 0x20 is 20 in the hexadecimal system, i.e., 32 in the decimal system.

The expression "clear the bit" means to make the bit 0. The expression "set the bit" means to make the bit 1.

The phrase "ATA bus" means an ATA/ATAPI bus and more specifically means an enhanced IDE bus unless otherwise defined.

The term "ODC" means an optical disc controller as described above.

EXAMPLE 1

1.1 System Structure

Figure 1:
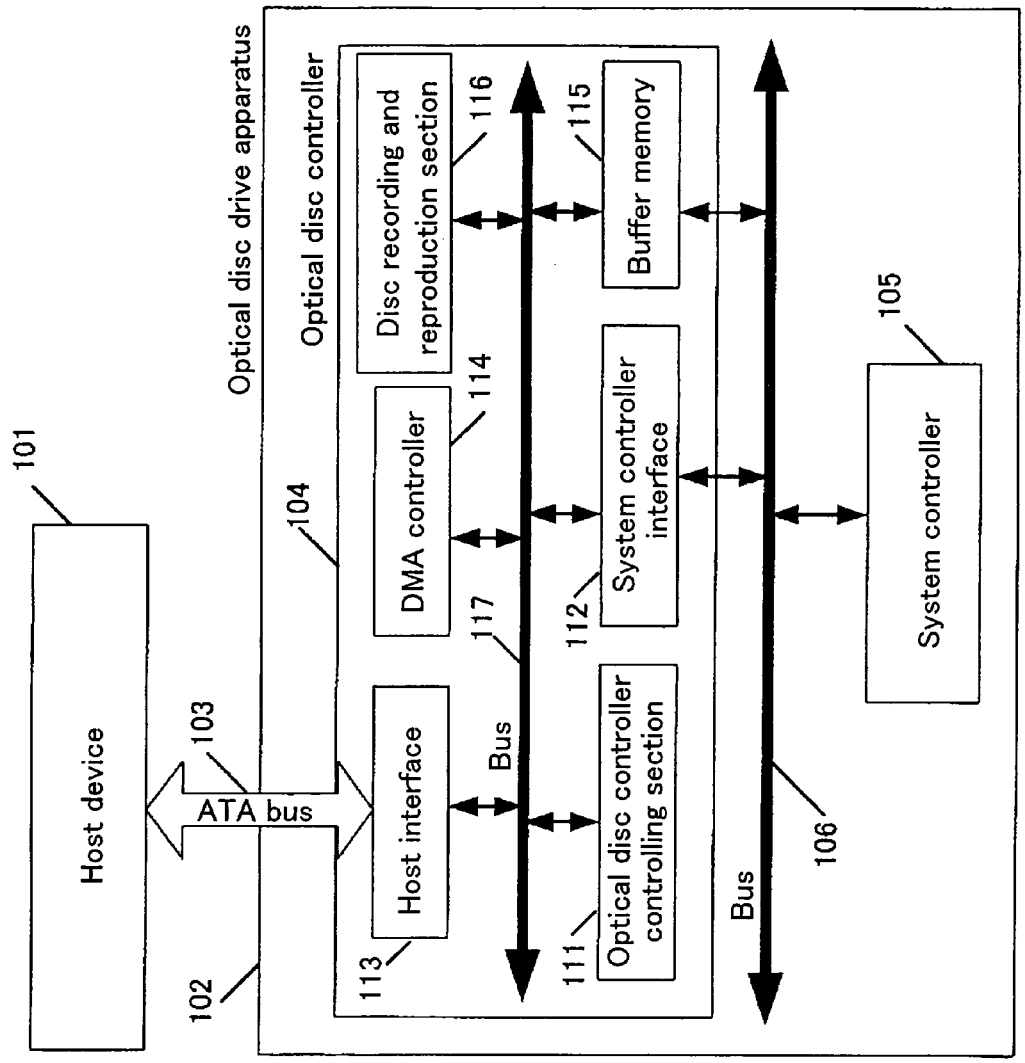
FIG. 1 shows a structure of an optical disc drive apparatus 102 according to a first example of the present invention.

FIG. 1 shows a structure of an optical disc drive apparatus 102 according to a first example of the present invention.

The optical disc drive apparatus 102 is connected to an ATA bus 103 as a main connection device. The bus 103 is also connected to a host device 101 (for example, a personal computer).

The optical disc drive apparatus 102 includes an optical disc controller 104 for, for example, performing data read from and data write to an optical disc and performing communication with the host device 101, a system controller 105 for controlling the entirety of the optical disc drive apparatus 102, and a bus 106. The optical disc controller 104 and the system controller 105 access each other via the bus 106.

The optical disc controller 104 includes an optical disc controller controlling section 111, a system controller interface 112, a host interface 113, a DMA controller 114, a buffer memory 115, a disc recording and reproduction section 116, and a bus 117. The optical disc controller controlling section 111, the system controller interface 112, the host interface 113, the DMA controller 114, the buffer memory 115, and the disc recording and reproduction section 116 access each other via the bus 117.

The optical disc controller controlling section 111 is a processing section for controlling each of the elements included in the optical disc controller 104 so as to realize the functions of the optical disc controller 104. In general, the optical disc controller controlling section 111 is software referred to as a microcode incorporated into an LSI.

The system controller interface 112 performs, for example, communication with the system controller 105. The system controller interface 112 is an interface for realizing access from the system controller 105 to the optical disc controller 104. The system controller interface 112 is accessible from the optical disc controller controlling section 111 and also from the system controller 105.

The host interface 113, for example, receives an ATA commands and/or a Packet command (hereinafter, referred to also as an "ATA/Packet command") issued by the host device 101 to the optical disc drive apparatus 102 and performs, for example, communication and data transfer with the host device 101. Such operations of the host interface 113 is performed via the bus 103. When the ATAPI Standard is adopted, the host interface 113 is an ATA/ATAPI protocol controller for controlling ATA/ATAPI Standard protocol processing, although the host interface 113 is not limited to this. The host interface 113 is connected to the host device 101 via, for example, the ATA bus 103, and is capable of receiving an ATA/Packet command and the like.

The DMA controller 114 transfers data with the buffer memory 115. The DMA controller 114 is hardware for controlling DMA (direct memory access) transfer which is high speed data transfer, and controls data write to the buffer memory 115 and data read from the buffer memory 115.

For example, the optical disc controller controlling section 111, the system controller interface 112, the host interface 113, and the DMA controller 114 act as an interface circuit for performing communication with the host device 101 and with system controller 105 which controls the optical disc drive apparatus 102. The interface circuit is, for example, an ATA/ATAPI interface circuit.

The buffer memory 115 is a memory for temporarily saving and storing data, for example, data to be recorded on an optical disc and data read from the optical disc. In the first example, the buffer memory 115 is built in the optical disc controller 104, but does not need to be built in the optical disc controller 104. The buffer memory 115 may be located anywhere as long being capable of temporarily saving and storing data, for example, data to be recorded on the optical disc and data read from the optical disc. For example, the buffer memory 115 may be built in the optical disc drive apparatus 102 but outside the optical disc controller 104.

The disc recording and reproduction section 116 is provided for reading data from the optical disc or writing data to the optical disc.

Figure 2:
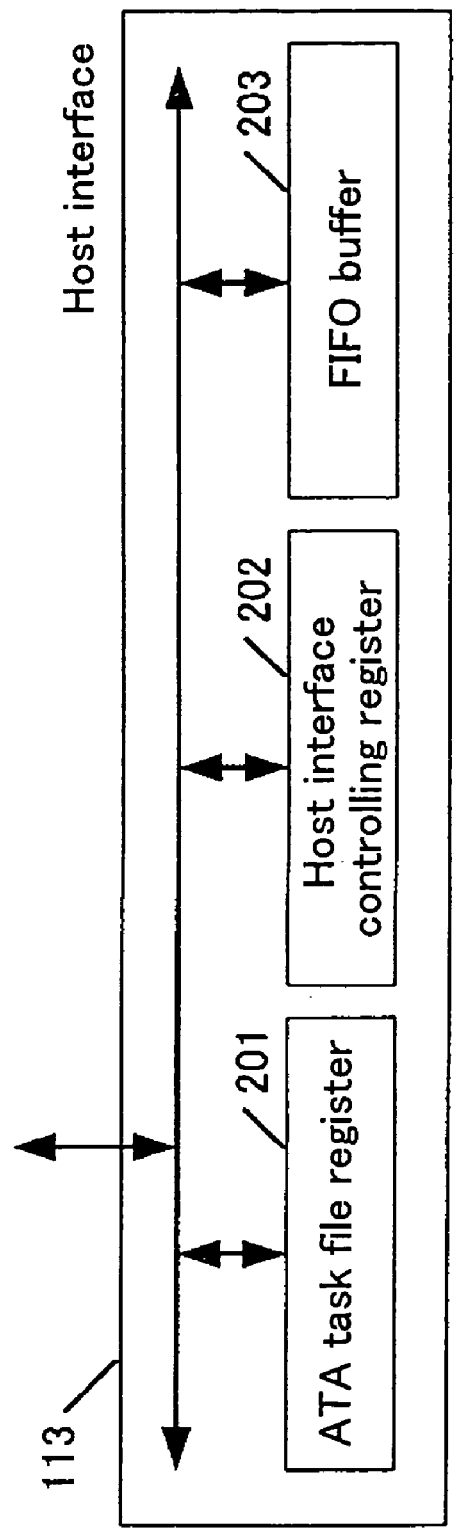
FIG. 2 shows a structure of a host interface 113 shown in FIG. 1.

FIG. 2 shows a structure of the host interface 113.

The host interface 113 include an ATA task file register (ATA register) 201, a host interface controlling register 202 and a FIFO (first-in first-out) buffer 203.

The ATA task file register 201 performs communication with the host device 101. The ATA task file register 201 is a register, from which data can be read and to which data can be written by both the host device 101 and the optical disc controller controlling section 111. The host interface controlling register 202 is a register, from which data be read and to which data can be written by only the optical disc controller controlling section 111. The FIFO buffer 203 is a buffer for temporarily storing data to be transferred between the host device 101 and the host interface 113.

Figure 3:
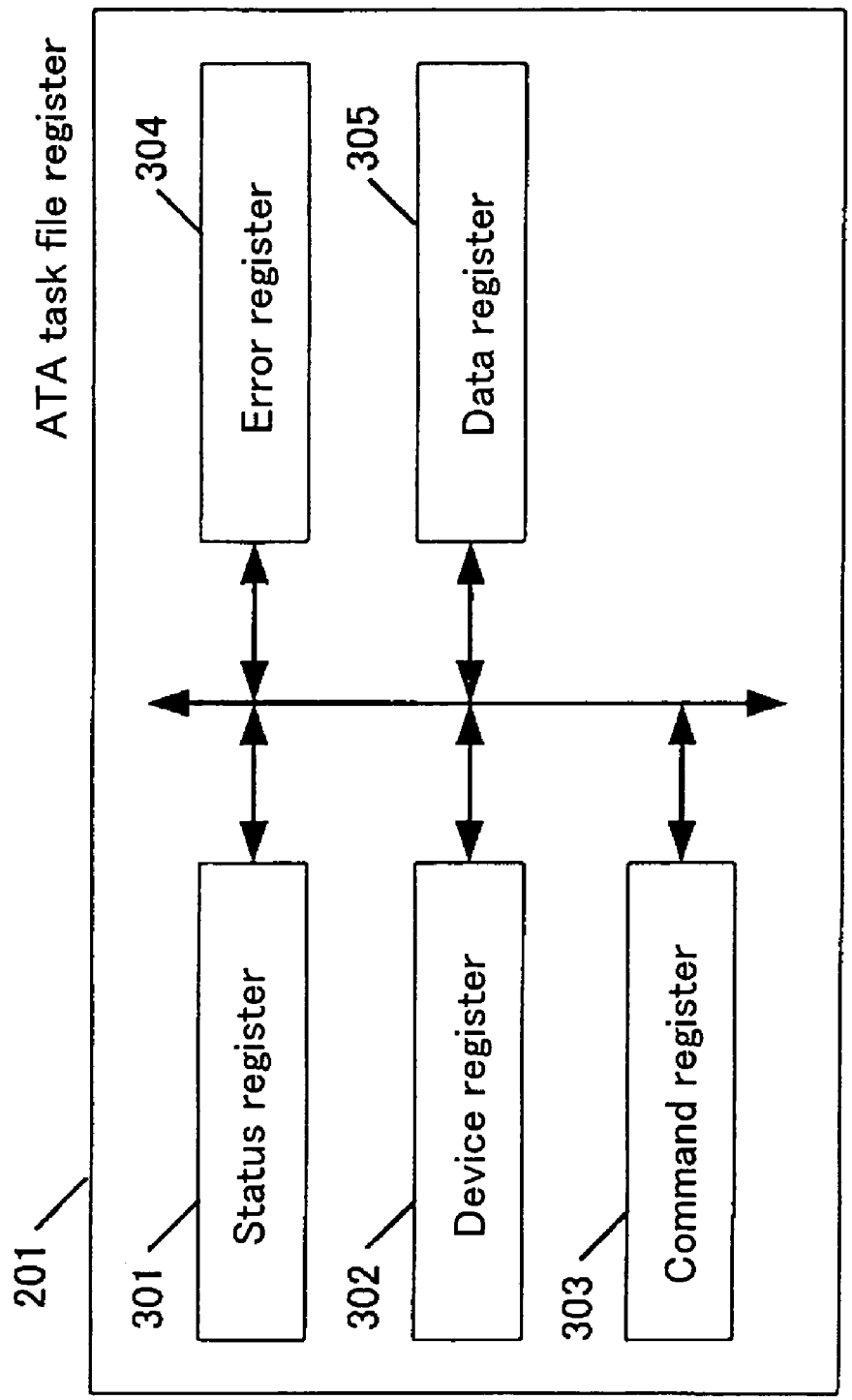
FIG. 3 shows a structure of an ATA task file register 201 shown in FIG. 2.

FIG. 3 shows an ATA task file register 201.

The ATA task file register 201 includes a status register 301 having, for example, an ERR bit and a BSY bit indicating a state of a prescribed device, a device register 302 having, for example, a DEV bit indicating whether the optical disc drive apparatus 102 is a master device or a slave device, a command register 303 for setting an ATA command which is issued by the host device 101 to the optical disc drive apparatus 102, an error register 304 having, for example, an ABRT bit indicating a prescribed device processing result, and a data register 305 used for sending and receiving data between the host device 101 and the optical disc drive apparatus 102.

Figure 4:
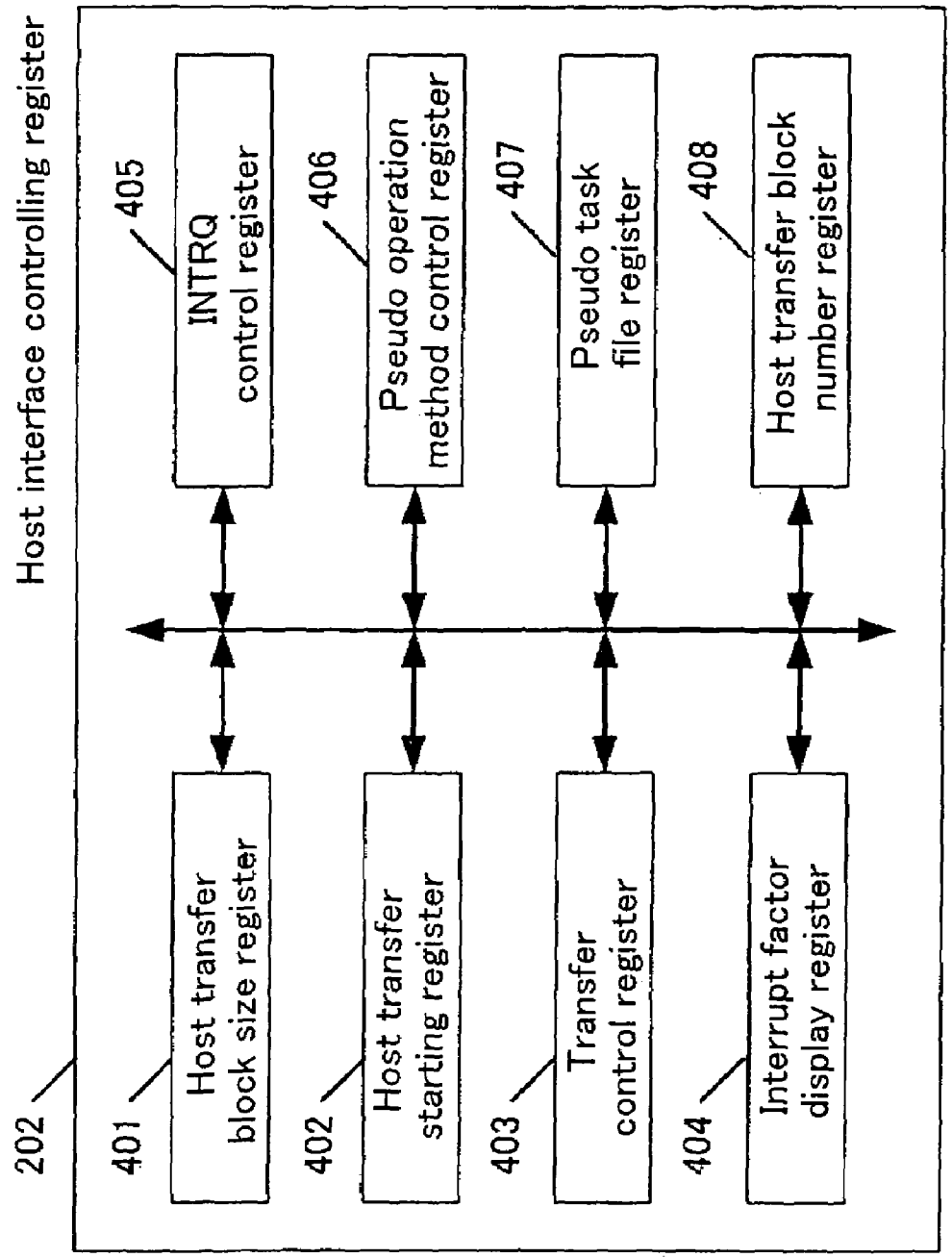
FIG. 4 shows a structure of a host interface controlling register 202 shown in FIG. 2.

FIG. 4 shows a structure of the host interface controlling register 202.

The host interface controlling register 202 includes a host transfer block number register 408 for specifying the number of transfer blocks to be transferred in a data transfer between the host device 101 and the optical disc controller 104, a host transfer block size register 401 for specifying the size of the block, a host transfer starting register 402 for controlling the start of the data transfer, a transfer control register 403 for specifying a data transfer direction and a data transfer format of the host device 101, an interrupt factor display register 404 for displaying an interrupt factor which is notified to the host interface 113 by the host device 101, and an INTRQ control register 405 for controlling the output of an INTRQ signal which is output to the host device 101 in order to report to the host device 101 that execution of an ATA/Packet command received from the host device 101 has been completed.

The data transfer between the host device 101 and the optical disc controller 104 is always performed in units of 2 bytes. Therefore, generally, the number of words to be transferred is set in the host transfer block size register 401. The number of words to be transferred is, for example, a logical product of a value held by the host transfer block number register 408 and a value held by the host transfer block size register 401.

The host interface control register 202 further includes a pseudo operation method control register 406 and a pseudo task file register 407.

The pseudo operation method control register 406 sets, for example, an operation method of the master device in the case where the host device 101 issues an ATA/Packet command to a slave device which does not exist.

The pseudo task file register 407 holds a value regarding operation method information. In the case where no slave device exists, the pseudo task file register 407 operates instead of a task file register included in the slave device. The operation method information will be described below in detail.

Figure 5:
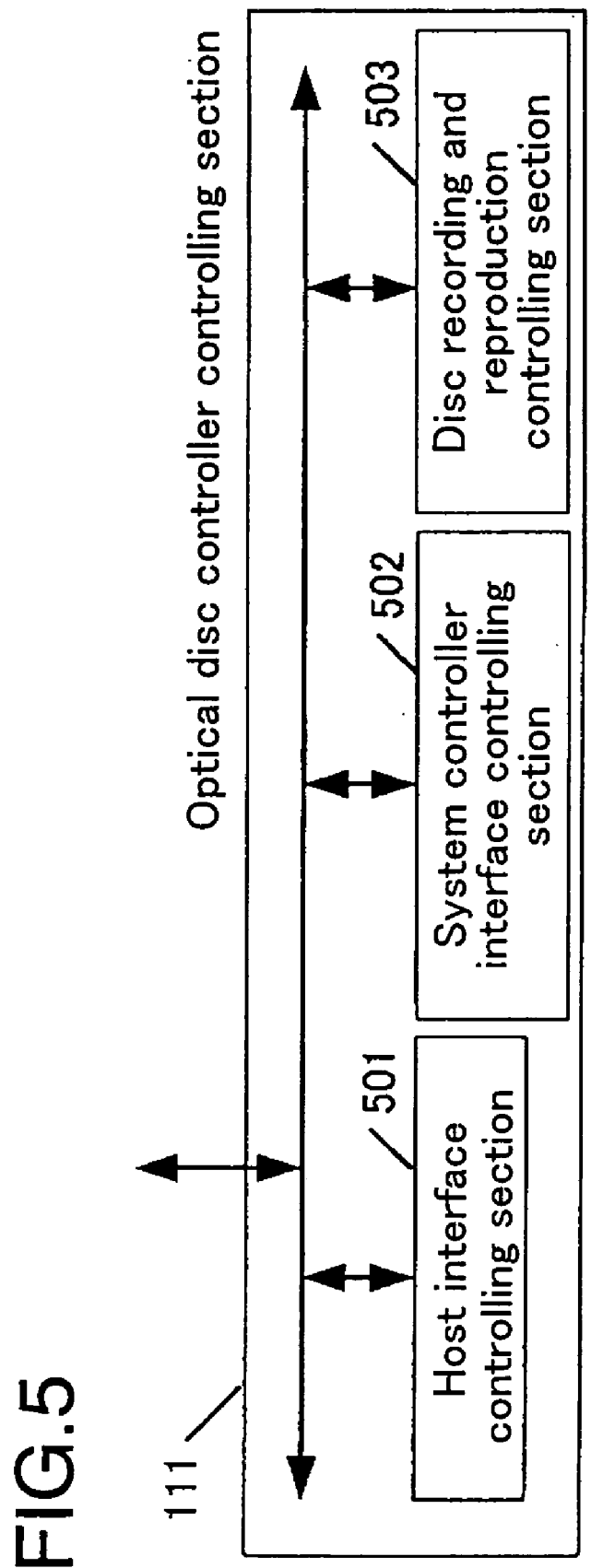
FIG. 5 shows a structure of an optical disc controller controlling section 111 shown in FIG. 1.

FIG. 5 shows a structure of the optical disc controller controlling section 111.

The optical disc controller controlling section 111 includes a host interface controlling section 501, a system controller interface controlling section 502, and a disc recording and reproduction controlling section 503.

The host interface controlling section 501 is, for example, software for controlling the host interface 113. The host interface controlling section 501 mainly performs data transfer between the host device 101 and the optical disc drive apparatus 102 via the ATA bus 103, and controls the ATAPI Standard protocol processing.

The system controller interface controlling section 502 is, for example, software for controlling the system controller interface 112. The system controller interface controlling section 502 mainly notifies the system controller 105 of the ATA/Packet command issued by the host interface 101 to the optical disc drive apparatus 102 and receives operation control commands sent from the system controller 105 to the optical disc controller 104.

The disc recording and reproduction controlling section 503 is, for example, software for controlling data reproduction from, and data recording to, the optical disc. The disc recording and reproduction controlling section 503 mainly controls the disc recording and reproduction section 116 to store data read from the optical disc in the buffer memory 115 or record data stored in the buffer memory 115 from the host device 101 to the optical disc.

Figure 6:
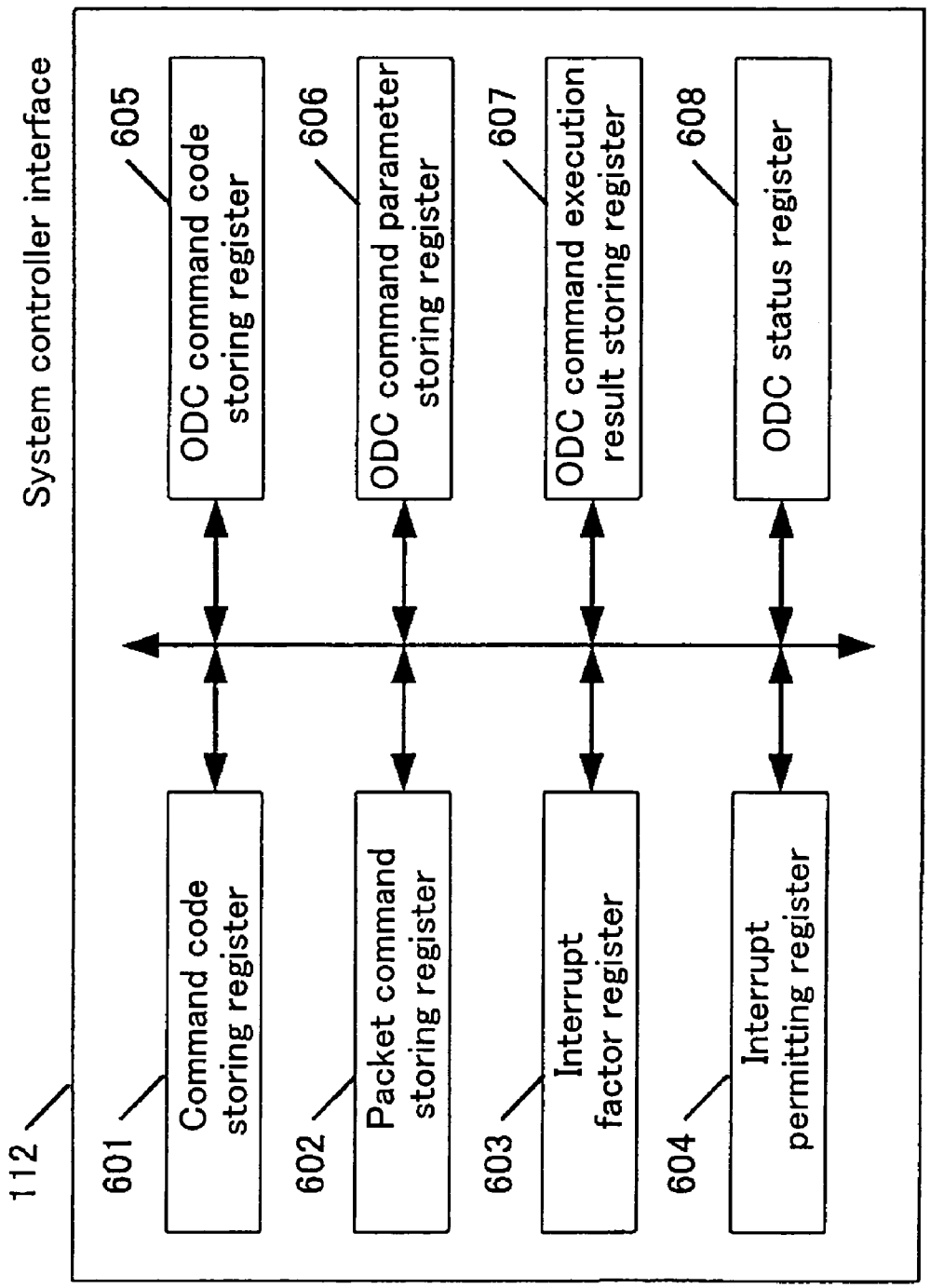
FIG. 6 shows a structure of a system controller interface 112 shown in FIG. 1.

FIG. 6 shows a structure of the system controller interface 112.

The system controller interface 112 includes a command code storing register 601, a Packet command storing register 602, an interrupt factor register 603, an interrupt permitting register 604, an ODC command code storing register 605, an ODC command parameter storing register 606, an ODC command execution result storing register 607, and an ODC status register 608.

The command code storing register 601 is a register for storing a command operation code of the ATA/Packet command issued by the host device 101 via the ATA bus 103, and notifying the system controller 105 of the stored command operation code. When an ATA/Packet command is received, the host interface controlling section 501 included in the optical disc controller controlling section 111 stores a value of the command register 303 included in the ATA task file register 201 in the command code storing register 601. For example, when a "Device Reset" command, which is an ATA command, is received, 0x08 is stored. When a Packet command is received, 0xA0 is stored.

The Packet command storing register 602 is a register for, when receiving a Packet command from the host device 101, storing a Packet command parameter therein and notifying the system controller 105 of the Packet command parameter. The Packet command storing register 602 includes 16 bytes in total.

A Packet command includes 12 bytes at the maximum. The Packet command storing register 602 includes 16 bytes in this example in consideration of expandability to other host interfaces such as IEEE 1394 or the like. Accordingly, it is sufficient that the Packet command storing register 602 includes at least 12 bytes.

When a Packet command is received, the host interface controlling section 501 included in the optical disc controller controlling section 111 stores a Packet command parameter, notified via the FIFO buffer 203 included in the host interface 113, in the Packet command storing register 602. For example, when an "Inquiry" command, which is a Packet command, is issued with a transfer length of 0x40 bytes, the "Inquiry" command is represented as data with 12 bytes.

FIG. 15 shows an example of the "Inquiry" command.

The "Inquiry" command stored in the Packet command storing register 602 includes 0x12, 0x00, 0x00, 0x00, 0x40, 0x00, 0x00, 0x00, 0x00, 0x00, 0x00, and 0x00 from the beginning of the Packet command storing register 602.

The optical disc controller 104 needs to recognize that the system controller 105 has read the data stored in the Packet command storing register 602 in order to avoid the following: before the system controller 105 reads the Packet command parameter stored in the Packet command storing register 602, a new ATA/Packet command is issued by the host device 101 and the data in the Packet command storing register 602 is overwritten by the new ATA/Packet command. For preventing this, when the system controller 105 reads the 16th byte of the data in the Packet command storing register 602, an interrupt is generated to the optical disc controller 104. Using this interrupt, the optical disc controller controlling section 111 included in the optical disc controller 104 manages the receiving state of the command issued by the host device 101.

The time for generating an interrupt is not limited to when the system controller 105 reads the 16th byte of the data. An interrupt may be generated at any time as long as the optical disc controller 104 can confirm that the system controller 105 has read the data in the Packet command storing register 602.

The Packet command storing register 602 is also used for, when the host device 101 issues an ATA command, notifying the system controller 105 of a value which is set in a specific register in the ATA task file register 201 as a parameter of the ATA command.

The interrupt factor register 603 is a register used by the optical disc controller 104 for notifying the system controller 105 of the generated interrupt factor. The notification of the generated interrupt factor is, for example, "ATA/Packet command is received" or "data transfer is completed". Usually, a different interrupt factor for each bit is notified to the interrupt factor register 603, and therefore a different interrupt factor is assigned to each bit.

The interrupt permitting register 604 is a register for permitting generation of an interrupt to the system controller 105. When an interrupt factor set in the interrupt permitting register 604 is generated, an interrupt is generated to the system controller 105 by the optical disc controller 104. Usually, an interrupt factor is located in the interrupt permitting register 604 in a similar bit arrangement to that in the interrupt factor register 603.

The ODC command code storing register 605 is a register for storing an ODC command code of a command provided by the optical disc controller 104 to the system controller 105 (hereinafter, referred to as an "ODC command") in order that the system controller 105 issue an operation control instruction to the optical disc controller 104.

ODC commands generally include host-related ODC commands for operation control between the host device 101 and the optical disc controller 104, disc-related ODC commands for control of disc management operations including data write to, or data read from, the optical disc, and servo-related ODC commands for servo operation management.

In the first example, operations regarding ODC commands for operation control between the host device 101 and the optical disc controller 104 will be described. Hereinafter, the phrase "ODC commands" refers to host-related ODC commands unless otherwise defined.

The ODC commands include "usual ODC commands" which cannot be issued by the host device 101 while the optical disc controller 104 is executing another command, and "special ODC commands" which can be issued by the host device 101 even while the optical disc controller 104 is executing another command.

The usual ODC commands include, for example, an "XBSND" command for starting data transfer from the buffer memory 115 to the host device 101 and an "XBRCV" command for starting data transfer from the host device 101 to the buffer memory 115. A command execution result of an usual ODC command is reported to the system controller 105 from the optical disc controller 104 by the ODC command execution result storing register 607.

The special ODC commands include, for example, a "CNTRST" command for notifying the optical disc controller 104 of a drive self-diagnostic result from the system controller 105. A command execution result of a special ODC command is not reported to the system controller 105, unlike the command execution result of an usual ODC command. When the system controller 105 sets an ODC command in the ODC command code storing register 605, an interrupt is generated to the optical disc controller 104.

The ODC command parameter storing register 606 is a register for storing a command parameter of an ODC command which is stored in the ODC command code storing register 605.

The ODC command execution result storing register 607 is register for notifying the system controller 105 of an execution result of processing performed by the optical disc controller 104 based on the command which was set in the ODC command code storing register 605. When the system controller 105 reads the data in the ODC command execution result storing register 607, an interrupt is generated to the optical disc controller 104.

In the case where, as ODC commands, a host-related ODC command, a disc-related ODC command, and a servo-related ODC command are used, the ODC command code storing register 605, the ODC command parameter storing register 606, and the ODC command execution result storing register 607 respectively include, in general, a host-related register, a disc-related register, and a servo-related register. In this example, since host-related ODC commands are used as the ODC commands, the disc-related ODC commands and the servo-related command will not be described.

The ODC status register 608 is a register for notifying the system controller 105 of a command execution state of the optical disc controller 104.

Figure 8:
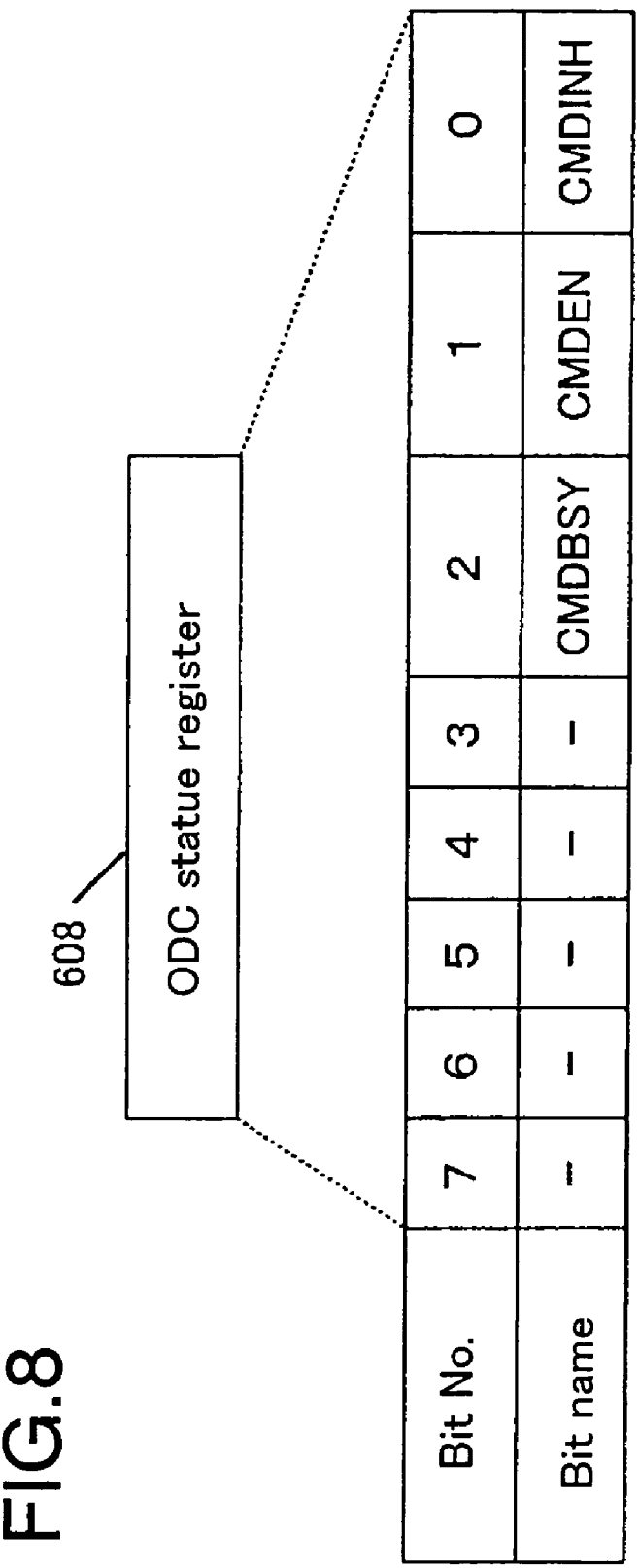
FIG. 8 shows an example of information held by an ODC status register 608 shown in FIG. 6.

FIG. 8 shows an example of information held by the ODC status register 608. The ODC status register 608 holds, for example, a "CMDINH" bit, a "CMDEN" bit and a "CMDBSY" bit. The "CMDINH" bit indicates whether the optical disc controller 104 is permitted to receive a command or not. The "CMDEN" bit indicates whether the optical disc controller 104 is permitted to receive a usual ODC command or not. The "CMDBSY" bit indicates whether the optical disc controller 104 is executing a usual ODC command. Based on information indicated by these bits, the system controller 105 confirms the command execution state of the optical disc controller 104.

The name of each bit and the bit arrangement are arbitrary. The information indicated by the "CMDINH" bit, the "CMDEN" bit and the "CMDBSY" bit may be located at a bit corresponding to any bit number. In FIG. 8, "-" in the "bit name" section means an "unused bit" in this example. It is possible to provide "-" with a meaning when necessary.

When the CMDINH bit is "1", that means that the optical disc controller 104 is prohibited from receiving a new ODC command. When the CMDINH bit is "0", that means that the optical disc controller 104 is permitted to receive a new ODC command.

When the CMDEN bit is "1", that means that the optical disc controller 104 is permitted to receive a usual ODC command receipt. When the CMDINH bit is "0", that means that the optical disc controller 104 is prohibited from receiving a usual ODC command.

When the CMDBSY bit is "1", that means that the optical disc controller 104 is executing a usual ODC command. When the CMDBSY bit is "0", that means that the optical disc controller 104 is not executing a usual ODC command.

For example, the initial values of the bits held by the ODC status register 608 areas follows. The initial value of the CMDINH bit is "0", the initial value of the CMDEN bit is "1", and the initial value of the CMDBSY bit is "0".

In the case where, as ODC commands, a host-related ODC command, a disc-related ODC command, and a servo-related ODC command are used, information corresponding to the CMDINH bit, the CMDEN bit and the CMDBSY bit also needs to be held. In this example, since host-related ODC commands are used as the ODC commands, the disc-related ODC commands and the servo-related command will not be described.

Figure 7:
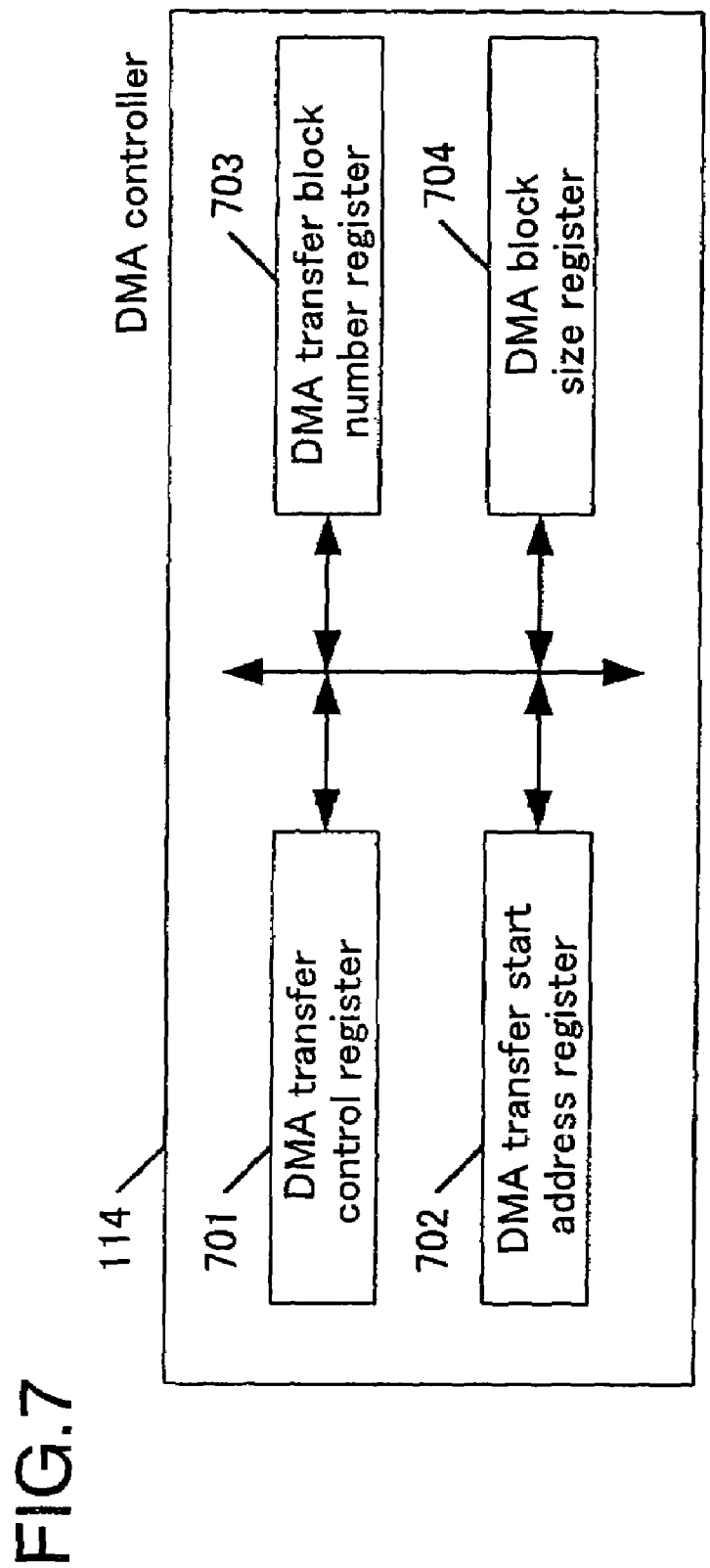
FIG. 7 shows a structure of a DMA controller 114 shown in FIG. 1.

FIG. 7 shows a structure of the DMA controller 114.

The DMA controller 114 includes a DMA transfer control register 701 for setting a transfer direction and transfer start, a DMA transfer start address register 702 for setting an address of the position at which a transfer is started to be started on the data buffer 115, a DMA transfer block number register 703 indicating the number of transfer blocks in the data transfer between the DMA controller 114 and the buffer memory 115, and a DMA transfer block size register 704 indicating the size of the blocks.

The data transfer between the DMA controller 114 and the buffer memory 115 is generally performed in units of 2 bytes. Therefore, the number of words to be transferred is set in the DMA block size register 704. The total number of words to be transferred is, for example, a logical product of a value held by the DMA transfer block number register 703 and a value held by the DMA transfer block size register 704.

In the example shown in FIGS. 1 and 4, the host interface 113 acts as a "host data transfer section for performing data transfer with the upstream device" or an "interface communication section for performing communication with the upstream device". The DMA controller 114 acts as a "buffer data transfer section for performing data transfer with a data buffer". The system controller interface 112 acts as a "system interface communication section for performing communication with the system controller". The optical disc controller controlling section 111 acts as an "interface control section for controlling the host data transfer section, the buffer data transfer section, and the system interface communication section", an "interface control section for controlling the interface communication section and the system interface communication section", or an "interface control section for controlling the ATA task file register, the system interface communication section, and the pseudo task file register". The buffer memory 115 acts as a "data buffer capable of storing data". The disc recording and reproduction section 116 acts as a "disc recording and reproduction control section for performing data recording to and data reproduction from a disc". The pseudo task file register 407 acts as a "pseudo task file register operating instead of an ATA task file register included in a slave device corresponding to the master device".

For example, the system controller interface 112, the host interface 113, the DMA controller 114 and the optical disc controller controlling section 111 correspond to an "interface circuit for performing communication with an upstream device and with a system controller". The optical disc controller 104 corresponds to a "disc controller comprising an interface circuit and a disc recording and reproduction control section". The optical disc drive apparatus 102 corresponds to a "disc drive apparatus comprising an interface circuit for performing communication with an upstream device, a data buffer capable of storing data, and a system controller".

However, the interface circuit, the disc controller, and the disc drive apparatus according to the present invention are not limited to those shown in FIGS. 1 and 4. FIGS. 1 and 4 merely show an example of how the functions of the interface circuit, the disc controller, the disc drive apparatus, and the interface control method according to the present invention are provided. As long as the above-described functions of the elements, the interface circuit, the disc controller, and the disc drive apparatus may have an arbitrary structure according to the present invention. For example, the above-described functions of the elements may be realized by hardware, software, or a combination of hardware and software.

1.2 Operation of the Optical Disc Drive Apparatus 102

Hereinafter, a method for realizing the ATAPI Standard protocol processing, a method for realizing customization, and the like using the optical disc drive apparatus 102 will be described.

1.2.1 Reset Protocol Processing

According to the ATAPI Standard, a "hardware reset" protocol, a "software reset" protocol and the like are defined as reset-related protocols. "Reset" is processing for, for example, initializing the ATA bus, initializing the task file register, and initializing a drive connected to the ATA bus.

Figure 9:
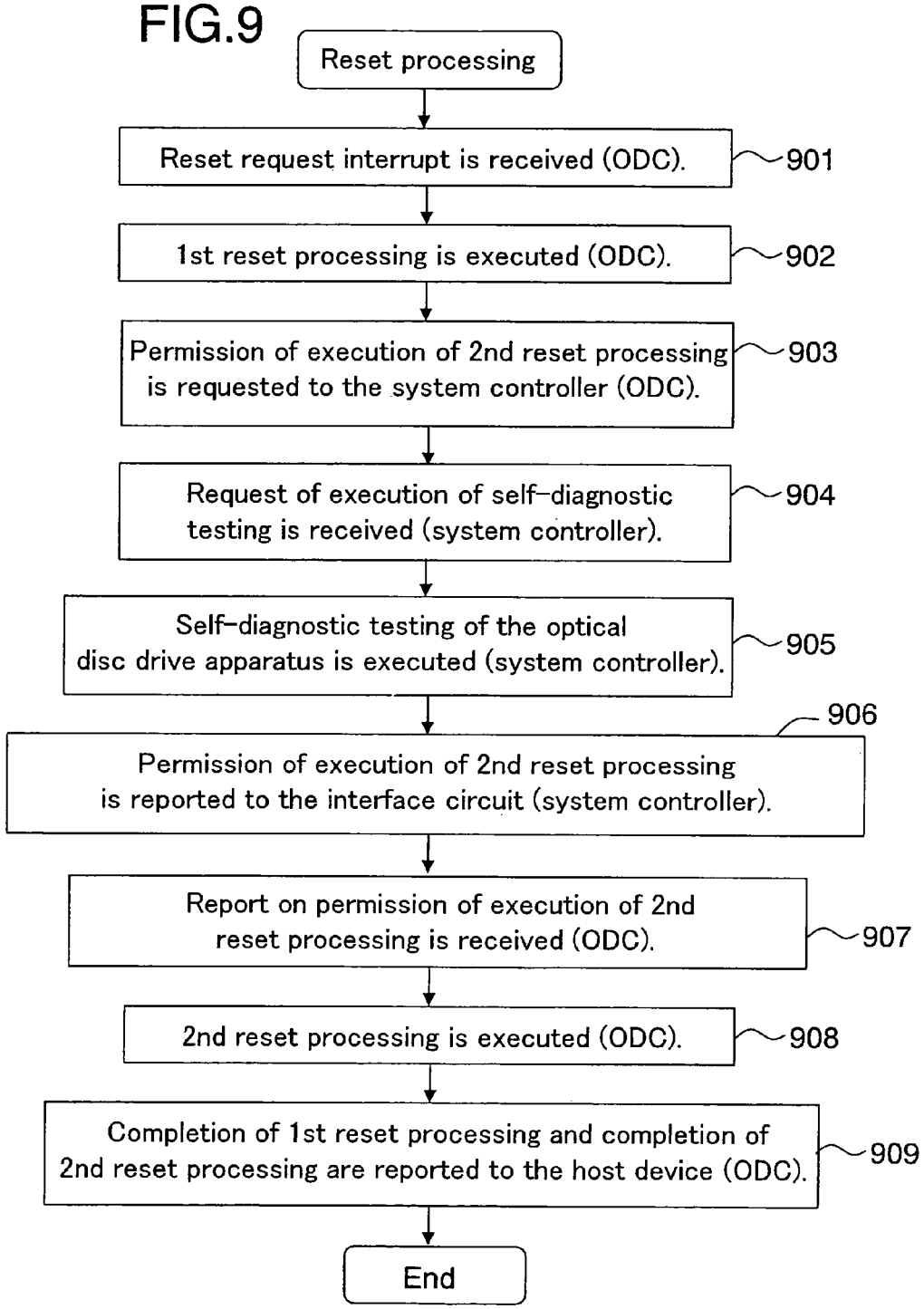
FIG. 9 is a flowchart illustrating a reset protocol processing procedure using the optical disc drive apparatus 102 shown in FIG. 1.

FIG. 9 shows a flow of the reset protocol processing using the optical disc drive apparatus 102. Hereinafter, the reset protocol processing using the optical disc drive apparatus 102 will be described step by step with reference to FIG. 9. In the following example, the optical disc drive apparatus 102 is a master device, and "hardware reset" is requested.

An interrupt is generated to the optical disc controller 104 from the host device 101 as a trigger for starting the reset protocol processing. At this point, the interrupt factor is displayed on the interrupt factor display register 404 included in the host interface controlling register 202 in the host interface 113. The interrupt factor is a "hardware reset" interrupt.

Step 901: When the optical disc controller 104 recognizes the interrupt, the BSY bit in the status register 301 included in the ATA task file register 201 becomes "1". The host interface controlling section 501 included in the optical disc controller controlling section 111 reads the content in the interrupt factor display register 404, so that the generated interrupt factor is confirmed to be a hardware reset interrupt factor.

Step 902: The optical disc controller controlling section 111 executes first reset processing. For example, the first reset processing does not include prescribed processing on or related to self-diagnostic testing. Self-diagnostic testing is processing for detecting an abnormality in the disc drive apparatus (for example, logical contradiction or abnormality). For example, the host interface controlling section 501, which has confirmed that the interrupt factor is a hardware reset interrupt factor, executes self-diagnostic testing pre-processing to the host interface 113. The self-diagnostic testing pre-processing is, for example, to detect a DASP signal indicating that a slave device exists, or to initialize the task file register (e.g., to clear a DEV bit in the device register 302 included in the ATA task file register 201).

Step 903: The optical disc controller controlling section 111 requests the system controller interface 112 to request the system controller 105 to permit execution of second reset processing, which is different from the first reset processing. For example, the second reset processing includes prescribed processing related to self-diagnostic testing. For example, the host interface controlling section 501 requests the system controller 105 to execute self-diagnostic testing of the optical disc drive apparatus 102 and to report the result of the self-diagnostic testing of the optical disc drive apparatus 102. For example, the host interface controlling section 501 sets, in the interrupt factor register 603 in the system controller interface 112, a bit corresponding to a "self-diagnostic testing execution request" interrupt factor. Thus, an interrupt is generated by the optical disc controller 104 to the system controller 105.

The bit corresponding to the "self-diagnostic testing execution request" interrupt factor in the interrupt permitting register 604 included in the system controller interface 112 indicates that the "self-diagnostic testing execution request" is permitted to interrupt.

Step 904: The system controller 105, which has received the interrupt, confirms that the interrupt factor is the "self-diagnostic testing execution request" interrupt factor based on the interrupt factor register 603.

Step 905: The system controller 105, which has confirmed that the interrupt factor is the "self-diagnostic testing execution request" interrupt factor, executes the self-diagnostic testing of the optical disc drive apparatus 102.

Step 906: The system controller 105 reports to the interface circuit that execution of the second reset processing has been permitted. For example, the system controller 105 performs the following in order to report the result of the self-diagnostic testing executed in step 905 to the optical disc controller 104. The system controller 105 confirms that the CMDINH bit in the ODC status register 608 is "0", and then sets the result of the self-diagnostic testing in the ODC command parameter storing register 606. The system controller 105 also sets, in the ODC command code storing register 605, a command code (0x71 in this example) corresponding to the "CNTRST" which is provided by the optical disc controller 104 as a special ODC command for notifying the optical disc controller 104 of the result of the self-diagnostic testing. By the system controller 105 setting the ODC command in the ODC command code storing register 605, the CMDINH bit in the ODC status register 608 becomes "1" and an interrupt is generated to the optical disc controller 104.

Step 907: The optical disc controller controlling section 111 requests the system controller interface 112 to receive from the system controller 105 the report that execution of the second reset processing has been permitted. For example, the system controller interface controlling section 502, which has received an interrupt from the system controller 105, receives an ODC command code and a command parameter, and reports the received command parameter to the host interface controlling section 501 for processing the "CNTRST" command. The system controller interface controlling section 502, after reporting the parameter, clears the CMDINH bit in the ODC status register 608 to "0".

The "CNTRST" command is a special ODC command. Therefore, unlike the case of the "XBSND" command described in section 1.2.4 below and the like, the optical disc controller 104 does not set a bit corresponding to an "ODC command processing completion" interrupt factor in the interrupt factor register 603 to generate an interrupt in the system controller 105 or set a command execution result in the ODC command execution result storing register 607.

Step 908: The optical disc controller controlling section 111 executes the second reset processing in accordance with the report that execution of the second reset processing has been permitted. For example, when a slave device exists, the host interface controlling section 501, for example, detects a PDIAG signal issued to indicate that self-diagnostic testing of the slave device has been completed and sets the error register 304 in accordance with the received result of the self-diagnostic testing.

Step 909: The optical disc controller controlling section 111 requests the host interface 113 to report to the host device 101 that the first reset processing has been completed and the second reset processing has been completed. For example, the host interface controlling section 501 clears the BSY bit, the ERR bit and the like in the status register 301 to "0".

By the host interface controlling section 501 reporting to the host device 101 that the reset processing has been completed, the reset protocol processing is completed.

The optical disc drive apparatus 102 realizes the reset protocol processing by executing steps 901 through 909.

When a special ODC command is issued to the optical disc controller 104, the system controller 105 needs to set the ODC command in the ODC command code storing register 605 after confirming that CMDINH bit in the ODC status register 608 is "0". When a usual ODC command is issued to the optical disc controller 104, the system controller 105 needs to set the ODC command in the ODC command code storing register 605 after confirming that CMDINH bit in the ODC status register 608 is "0", the CMDEN bit is "1" and the CMDBSY bit is "0".

When a special ODC command is issued to the optical disc controller 104, the system controller 105 cannot determine whether the ODC command has been completed or not using the interrupt, unlike the case of the "XBSND" command as an usual ODC command described below in section 1.2.4. Therefore, the system controller 105 determines that the command has been completed by confirming that the CMDINH bit is cleared from "1" to "0" using the ODC status register 608.

According to the interface control method of the present invention, the reset protocol processing is executed in a first phase and a second phase. In the first phase, the optical disc controller controlling section 111 executes the first reset processing and requests the system controller interface 112 to request the system controller 105 to permit execution of the second reset processing, which is different from the first reset processing. In the second phase, the optical disc controller controlling section 111 executes the second reset processing in accordance with the report that execution of the second reset processing has been permitted, and requests the host interface 113 to report to the host device 101 that the second reset processing has been completed. By executing the reset processing in two phases and allowing the system controller 105 to perform operations between the first phase and the second phase, the reset processing can be controlled by the system controller 105 (for example, self-diagnostic testing which is needed to be executed on the entirety of the optical disc drive apparatus 102 is executed, or start of the second reset processing is permitted at arbitrary timing); i.e., the customization of the interface circuit is realized.

The control of the ATA task file register 201 defined by the Standard is executed by the host interface controlling section 501 included in the optical disc controller controlling section 111 in the optical disc controller 104, i.e., is automatically executed by an LSI, i.e., the optical disc controller 104. In this manner, the objective of the present invention of reducing the load on the system controller 105 can be achieved.

In the example shown in FIG. 9, step 902 corresponds to the step of "executing first reset processing"; step 903 corresponds to the step of "requesting the system interface communication section to request the system controller to permit execution of second reset processing which is different from the first reset processing"; step 906 corresponds to the step of "reporting the permission of the execution of the second reset processing to the interface circuit"; step 907 corresponds to the step of "requesting the system interface communication section to receive a report of the permission of the execution of the second reset processing from the system controller"; step 908 corresponds to the step of "executing the second reset processing in accordance with the report of the permission of the execution of the second reset processing"; and step 909 corresponds to the step of "requesting the interface communication section to report completion of the second reset processing to the upstream device".

However, the reset protocol processing according to the present invention is not limited to that shown in FIG. 9. The reset protocol processing may have an arbitrary procedure as long as the step of "executing first reset processing"; the step of "requesting the system interface communication section to request the system controller to permit execution of second reset processing which is different from the first reset processing"; the step of "reporting the permission of the execution of the second reset processing to the interface circuit"; the step of "requesting the system interface communication section to receive a report of the permission of the execution of the second reset processing from the system controller"; the step of "executing the second reset processing in accordance with the report of the permission of the execution of the second reset processing"; and the step of "requesting the interface communication section to report completion of the second reset processing to the upstream device" are realized.

1.2.2 Packet Command Receipt from the Host Device

Figure 10:
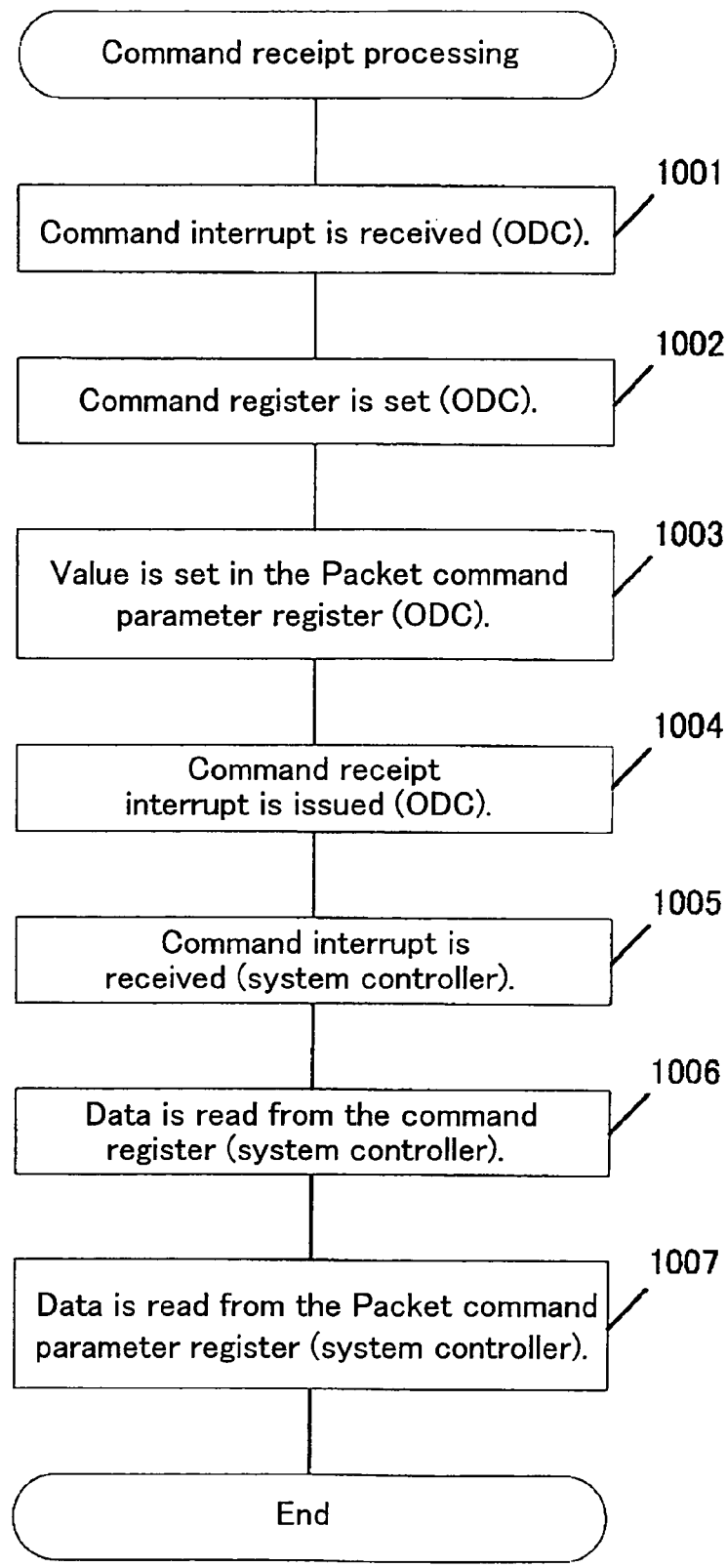
FIG. 10 is a flowchart illustrating a Packet or ATA command receipt processing procedure performed when a Packet or ATA command is received from a host device 101 shown in FIG. 1.

FIG. 10 shows a flow of the Packet command receipt processing performed when a Packet command is received from the host device 101. Hereinafter, the Packet command receipt processing of the optical disc drive apparatus 102 will be described step by step with reference to FIG. 10. In the following example, the optical disc drive apparatus 102 receives an "Inquiry" command, which is a Packet command represented by data of 12 bytes shown in FIG. 15.

When the host device 101 issues a Packet command, the host device 101 first sets a command code (0xA0 in this example) in the command register 303 in the ATA task file register 201, and a Packet command parameter is stored in the FIFO buffer 203. Thus, an interrupt is generated to the optical disc controller 104. At this point, the interrupt factor is displayed on the interrupt factor display register 404 included in the host interface controlling register 202 in the host interface 113. The interrupt factor is a "Packet command receipt" interrupt.

Step 1001: When the optical disc controller 104 recognizes the interrupt, the host interface controlling section 501 included in the optical disc controller controlling section 111 reads the content in the interrupt factor display register 404, so that the generated interrupt factor is confirmed to be a "Packet command receipt" interrupt factor.

Step 1002: The host interface controlling section 501 sets the command code (0xA0 in this example) which is set in the command register 303 in the command code storing register 601.

Step 1003: The host interface controlling section 501 further reads the Packet command parameter set in the FIFO buffer 203 and sets the Packet command parameter in the Packet command storing register 602 in the system controller interface 112. Step 1003 is executed until the command parameter setting is completed.

Step 1004: The host interface controlling section 501 notifies the system controller 105 that the command has been received from the host device 101. For example, the host interface controlling section 501 sets, in the interrupt factor register 603 in the system controller interface 112, a bit corresponding to a "command receipt from the host device" interrupt factor. Thus, an interrupt is generated by the optical disc controller 104 to the system controller 105.

At this point, the bit corresponding to the "command receipt from the host device" interrupt factor in the interrupt permitting register 604 included in the system controller interface 112 indicates that the "command receipt from the host device" is permitted to interrupt.

Step 1005: The system controller 105, which has received the interrupt, confirms that the interrupt factor is the "command receipt from the host device" interrupt factor based on the interrupt factor register 603.

Step 1006: The system controller 105, which has confirmed that the interrupt factor is the "command receipt from the host device" interrupt factor, reads the command code received from the command code storing register 601 in the system controller interface 112. The command is a Packet command, and the command code is 0xA0.

Step 1007: The system controller 105 reads the Packet command parameter received from the Packet command storing register 602. After the Packet command parameter received from the Packet command storing register 602 is read by the system controller 105, the Packet command receipt processing is completed.

The system controller 105 receives the Packet command issued by the host device 101 and executes command interpretation and processing corresponding to the command by executing steps 1001 through 1007.

1.2.3 ATA Command Receipt from the Host Device

Still with reference to FIG. 10, the ATA command receipt processing of the optical disc drive apparatus 102 when an ATA command is received from the host device 101 will be described step by step. In the following example, the optical disc drive apparatus 102 receives a "Set Feature" command (command code: 0xEF), which is an ATA command for notifying a prescribed device of the data transfer format of the host device 101 such as, for example, Ultra-DMA transfer, PIO transfer or the like.

When the host device 101 issues an ATA command, the host device 101 first sets a command code (0xEF in this example) in the command register 303 in the ATA task file register 201, and information on the parameter of this command is set in each register in the ATA task file register 201. Thus, an interrupt is generated to the optical disc controller 104. At this point, the interrupt factor is displayed on the interrupt factor display register 404 included in the host interface controlling register 202 in the host interface 113. The interrupt factor is an "ATA command receipt" interrupt.

Step 1001: When the optical disc controller 104 recognizes the interrupt, the host interface controlling section 501 included in the optical disc controller controlling section 111 reads the content in the interrupt factor display register 404, so that the generated interrupt factor is confirmed to be an "ATA command receipt" interrupt factor.

Step 1002: The host interface controlling section 501 sets the command code (0xEF in this example) which is set in the command register 303 in the command code storing register 601.

Step 1003: The host interface controlling section 501 further sets, in the in the Packet command storing register 602 in the system controller interface 112, the value of each register in the ATA task file register 201 used as a parameter of the ATA command. Step 1003 is executed until the operation of setting values in a necessary number of ATA task file registers is completed.

Step 1004: The host interface controlling section 501 reports to the system controller 105 that the command has been received from the host device 101. For example, the host interface controlling section 501 sets, in the interrupt factor register 603 in the system controller interface 112, a bit corresponding to a "command receipt from the host device" interrupt factor. Thus, an interrupt is generated by the optical disc controller 104 to the system controller 105.

At this point, the bit corresponding to the "command receipt from the host device" interrupt factor in the interrupt permitting register 604 included in the system controller interface 112 indicates that the "command receipt from the host device" is permitted to interrupt.

Step 1005: The system controller 105, which has received the interrupt, confirms that the interrupt factor is the "command receipt from the host device" interrupt factor based on the interrupt factor register 603.

Step 1006: The system controller 105, which has confirmed that the interrupt factor is the "command receipt from the host device" interrupt factor, reads the command code (0xEF in this example) received from the command code storing register 601 in the system controller interface 112.

Step 1007: The system controller 105 reads the value of ATA task file register 201 received from the Packet command storing register 602.

The system controller 105 receives the ATA command issued by the host device 101 and executes command interpretation and processing corresponding to the command by executing steps 1001 through 1007.

1.2.4 Data Transfer Processing

Figure 11:
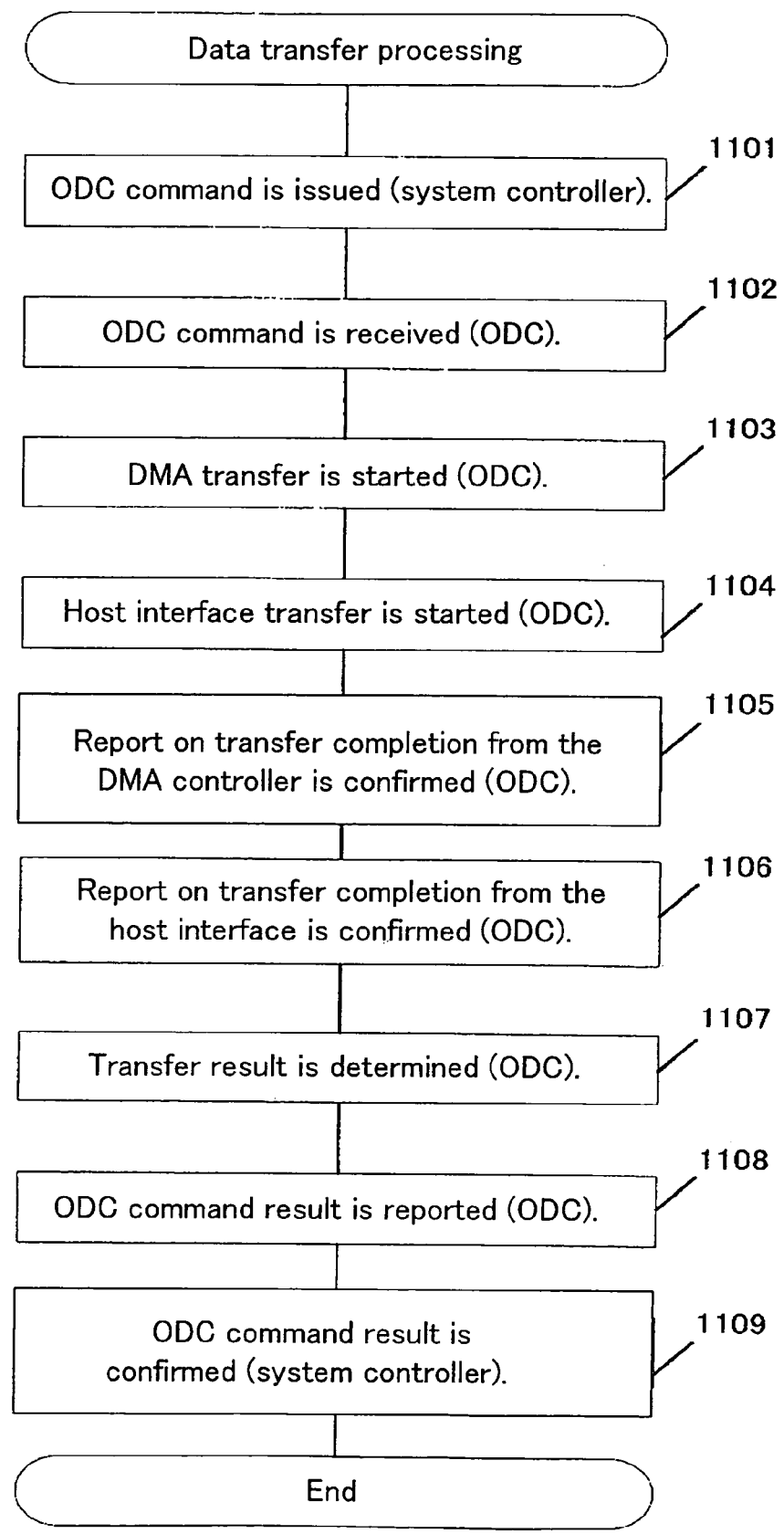
FIG. 11 is a flowchart illustrating a data transfer processing procedure performed by the optical disc drive apparatus 102 with the host device 101 via an ATA bus 103 shown in FIG. 1.

FIG. 11 shows a flow of data transfer processing performed by the optical disc drive apparatus 102 with the host device 101 via the ATA bus 103. Hereinafter, the data transfer processing will be described step by step with reference to FIG. 11. In the following example, the optical disc drive apparatus 102 receives a data transfer-related command from the host device 101, and data transfer is performed to the host device 101 from the buffer memory 115 included in the optical disc drive apparatus 102.

Step 1101: The system controller 105 requests data transfer between the host device 101 and the buffer memory 115. For example, the system controller 105 first confirms that the CMDINH bit in the ODC status register 608 is "0", the CMDEN bit is "1" and the CMDBSY bit is "0". Then, the system controller 105 calculates information on the size of the data to be transferred and position information of the data to be transferred on the buffer memory 115, based on the command parameter received from the host device 101. The system controller 105 further sets, in the ODC command parameter storing register 606, the information on the size of the data to be transferred and the position information of the data to be transferred on the buffer memory 115. The system controller 105 also sets, in the ODC command code storing register 605, a command code (0x01 in this example) representing the "XBSND" provided by the optical disc controller 104 as a usual ODC command for starting the data transfer to the host device 101.

When the system controller 105 sets the command code in the ODC command code storing register 605, the CMDINH bit in the ODC status register 608 becomes "1" and an interrupt is generated to the optical disc controller 104.

Step 1102: The optical disc controller 104, which has received the interrupt, reads the ODC command code from the ODC command code storing register 605 by the system controller interface controlling section 502, and reads the command parameter from the ODC command parameter storing register 606. The system controller interface controlling section 502 sets the CMDEN bit in the ODC status register 608 to "0" and the CMDBSY bit to "1". The system controller interface controlling section 502 also reports the command parameter to the host interface controlling section 501 for processing the received "XBSND" command. After reporting the command parameter, the system controller interface controlling section 502 clears the CMDINH bit in the ODC status register 608 to "0".

The host interface controlling section 501, which has received the command code and the command parameter from the system controller interface controlling section 502, executes processing corresponding to the received "XBSND" command.

Step 1103: In accordance with the request from the optical disc controller 104 for data transfer between the host device 101 and the buffer memory 115, the optical disc controller controlling section 111 requests the DMA controller 114 to perform data transfer with the buffer memory 115. For example, the host interface controlling section 501 calculates the size of the data to be transferred based on the received command parameter, and sets the size in the DMA transfer block number register 703 and the DMA transfer block size register 704. The host interface controlling section 501 further sets, in the DMA transfer start address register 702, the position information of the data to be transferred on the buffer memory 115 (i.e., the address of the position at which the transfer is started to be started), and also sets the data transfer direction and the data transfer start in the DMA transfer control register 701. The completion of the transfer performed by the started DMA controller 114 is notified by an interrupt.

Step 1104: In accordance with the request from the system controller 105 for data transfer between the host device 101 and the buffer memory 115, the optical disc controller controlling section 111 requests the host interface 113 to perform data transfer with the host device 101. For example, the host interface controlling section 501 sets the size of the data to be transferred in the host transfer block number register 408 and the host transfer block size register 401. The host interface controlling section 501 sets, for example, the data transfer direction and the data transfer format of the host device 101 in the transfer control register 403. The host interface controlling section 501 also sets transfer start of the host interface 113 in the host transfer starting register 402. The completion of the transfer performed by the started host interface 113 is notified by an interrupt.

Steps 1105 through 1107: Based on the report from the host interface 113 on the data transfer and the report from the DMA controller 114 on the data transfer, the optical disc controller controlling section 111 determines whether the data transfer between the host device 101 and the buffer memory 115 has been completed or not.

Step 1105: Based on the report from the DMA controller 114 on the data transfer, the optical disc controller controlling section 111 determines whether the data transfer between the buffer memory 115 and the DMA controller 114 has been completed or not. For example, the host interface controlling section 501 waits for notification of a transfer completion interrupt from the DMA controller 114 started for transfer. Based on the transfer completion interrupt from the DMA controller 114, the host interface controlling section 501 determines whether the data transfer processing by the started DMA controller 114 has been completed or not.

Step 1106: Based on the report from the host interface 113 on the data transfer, the optical disc controller controlling section 111 determines whether the data transfer between the host device 101 and the host interface 113 has been completed or not. For example, the host interface controlling section 501 waits for notification of a transfer completion interrupt from the host interface 113. Based on the transfer completion interrupt from the host interface 113, the host interface controlling section 501 determines whether the data transfer processing by the started host interface 113 has been completed or not.

Step 1107: When the data transfer between the host device 101 and the host interface 113 has been completed and the data transfer between the buffer memory 115 and the DMA controller 114.has been completed, the optical disc controller controlling section 111 determines that the data transfer between the host device 101 and the buffer memory 115 has been completed.

Step 1108: The optical disc controller controlling section 111 reports the result of command execution to the system controller 105. For example, the host interface controlling section 501 notifies the system controller 105 that the ODC command processing requested by the system controller 105 has been completed. In more detail, the host interface controlling section 501 sets the result of execution of the "XBSND" command in the ODC command execution result storing register 607, and sets the CMDEN bit in the ODC status register 608 to "1". The host interface controlling section 501 further sets a bit corresponding to the "ODC command processing completion" interrupt factor in the interrupt factor register 603. Thus, the host interface controlling section 501 generates an interrupt to the system controller 105 from the optical disc controller 104.

At this point, the bit corresponding to the "ODC command processing completion" interrupt factor in the interrupt permitting register 604 indicates that the "ODC command processing completion" is permitted to interrupt.

Step 1109: The system controller 105, which has received the interrupt, confirms that the interrupt factor is the "ODC command processing completion" interrupt factor based on the interrupt factor register 603. The system controller 105 further reads the result of command execution from the ODC command execution result storing register 607. Thus, the system controller 105 determines that processing of the "XBSND" command, which is an ODC command, has been completed.

When the system controller 105 reads the content in the ODC command execution result storing register 607 at this point, an interrupt is generated to the optical disc controller 104.

The optical disc controller 104, which has received the interrupt, clears the CMDBSY bit in the ODC status register 608 to "0" by the system interface controlling section 502.

The data transfer from the optical disc drive apparatus 102 to the host device 101 is realized by executing steps 1101 through 1109.

While the transfer completion interrupts are being waited for in steps 1105 and 1106, it may occur that the transfer is stopped in the middle by an error generated by some reason. In general, the transfer completion interrupts are notified even when such an error is generated. Thus, even in the case of such an error, it can be determined that the transfer has been completed and also the result of the transfer can be determined. However, it is conceivable that the transfer completion interrupts are not notified. Thus, it is desirable that the system controller 105 determines that a transfer error has occurred as follows, for example. The system controller 105, which has requested a data transfer by an ODC command, determines on a time-out when an ODC command processing completion interrupt is not notified even after a certain time period, and forcibly stops the data transfer processing of the optical disc controller 104. Alternatively, the host interface controlling section 501 waiting for the transfer completion sets a time limitation to determine on a time-out and report that an error has occurred on the command issued by the system controller 105.

In this example, as shown in step 1107, the data transfer between the host device 101 and the optical disc drive apparatus 102 is determined to have been completed by two interrupts, i.e., the transfer completion interrupt from the DMA controller 114 and the transfer completion interrupt from the host interface 113. Alternatively, for example, the data transfer may be determined to have been completed by one of the interrupts in accordance with the transfer direction. Specifically, in the case of data transfer from the optical disc drive apparatus 104 to the host device 101, data is read from the data buffer. 115 by the DMA controller 114 and the data is further transferred from the host interface 113 to the host device 101. Therefore, it is not necessary to confirm the completion of the transfer based on the report from the DMA controller 114. It is sufficient to confirm the completion of the transfer based on the report from the host interface 113, in order to confirm that the data transfer has been completed.

In the example shown in FIG. 11, step 1101 corresponds to the step of "requesting data transfer between the upstream device and the data buffer"; step 1104 corresponds to the step of "requesting the host data transfer section to perform data transfer between the upstream device and the host data transfer section in accordance with the request from the system controller to perform data transfer between the upstream device and the data buffer"; step 1103 corresponds to the step of "requesting the buffer data transfer section to perform data transfer between the data buffer and the buffer data transfer section in accordance with the request from the system controller to perform data transfer between the upstream device and the data buffer"; and steps 1105, 1106 and 1107 correspond to the step of "determining whether the data transfer between the upstream device and the data buffer has been completed or not based on a report from the host data transfer section on the data transfer and a report from the buffer data transfer section on the data transfer".

However, the data transfer processing according to the present invention is not limited to that shown in FIG. 11. The data transfer processing may have an arbitrary procedure as long as the step of "requesting data transfer between the upstream device and the data buffer"; the step of "requesting the host data transfer section to perform data transfer between the upstream device and the host data transfer section in accordance with the request from the system controller to perform data transfer between the upstream device and the data buffer"; the step of "requesting the buffer data transfer section to perform data transfer between the data buffer and the buffer data transfer section in accordance with the request from the system controller to perform data transfer between the upstream device and the data buffer"; and the step of "determining whether the data transfer between the upstream device and the data buffer has been completed or not based on a report from the host data transfer section on the data transfer and a report from the buffer data transfer section on the data transfer" are realized.

1.2.5 ATA/Packet Command Execution Completion Report Processing to the Host Device The optical disc drive apparatus 102 needs to notify the host device 101 that the command processing has been completed when processing of the ATA command and/or the Packet command received by the optical disc drive apparatus 102 from the host device 101 is completed. Thus, when the command processing is completed, the optical disc drive apparatus 102 performs settings of, for example, clearing the ABRT bit in the error register 304 in the ATA task file register 201 to "0" and clearing the BSY bit in the status register 301 to "0", and then outputs an INTRQ signal. In this manner, the optical disc drive apparatus 102 notifies the host device 101 of the completion of the command processing via the ATA bus 103.

The INTRQ signal is output to the host device 101 by setting an INTRQ output permission in the INTRQ control register 405.

In the optical disc drive apparatus 102, the system controller 105 performs operations from interpretation of the ATA command and the Packet command issued by the host device 101 to the command processing. Therefore, the system controller 105 needs to determine that the ATA command processing and the Packet command processing have been completed and also needs to determine the results of the command processing.

The error register 304 and the status register 301 in the ATA task file register 201 for reporting the completion of the processing of the ATA command and the Packing command received by the optical disc drive apparatus 102 to the host device 101, and the INTRQ control register 405 included in the host interface controlling register 202 for outputting an INTRQ signal, are only accessible from the optical disc controller controlling section 111. However, the optical disc controller controlling section 111 cannot determine that the processing of the ATA command and the Packet command received from the host device 101 has been completed.

Therefore, the optical disc controller 104 provides the system controller 105 with a "STATSET" command (command code: 0x31), which is a usual ODC command. The "STATSET" command is for reporting the completion of the ATA/Packet command processing to the host device 101 when the ATA/Packet command processing is completed.

Figure 12:
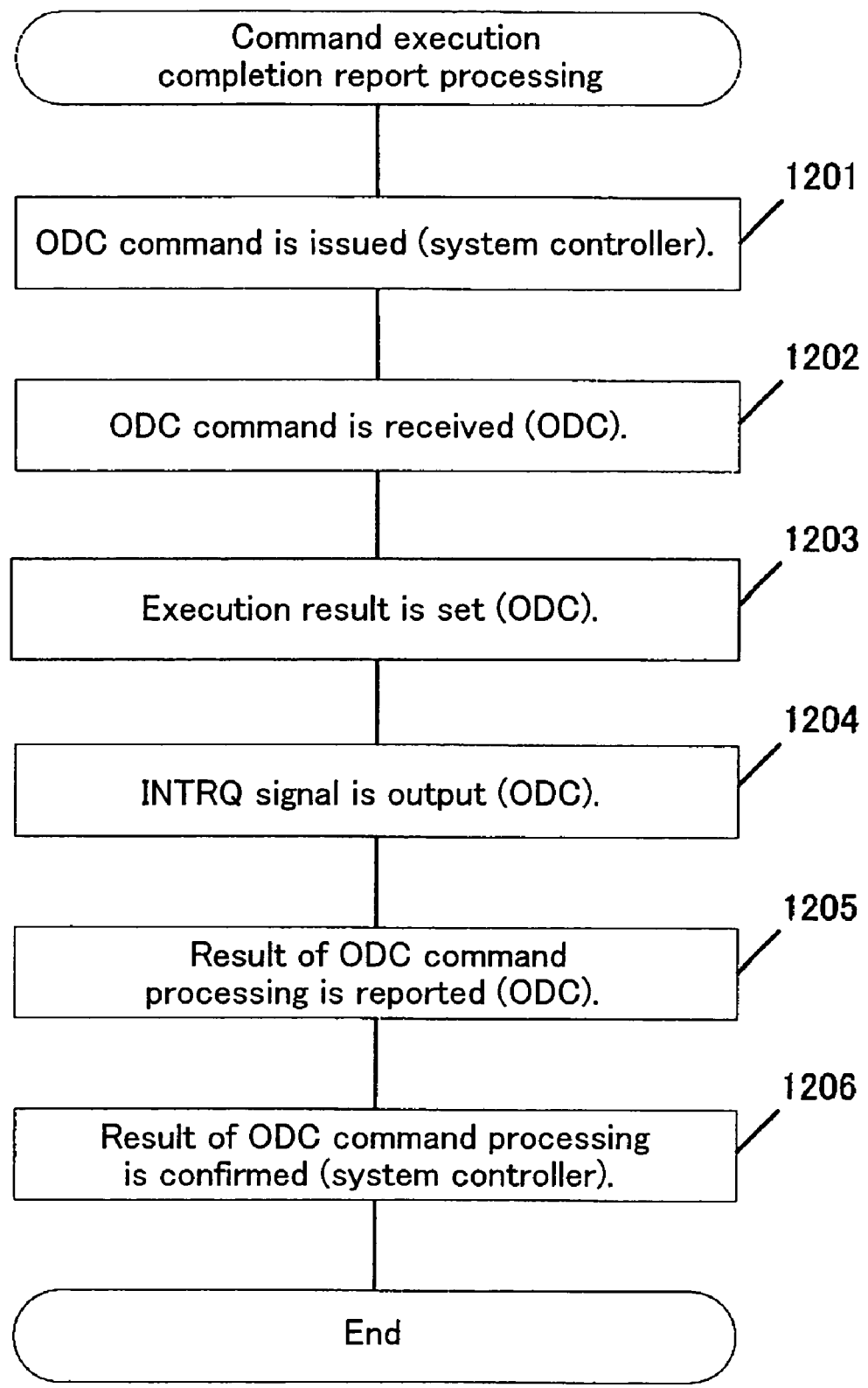
FIG. 12 is a flowchart illustrating a completion report processing procedure of processing of an ATA command and a Packet command received from the host device 101.

FIG. 12 shows a flow of ATA command and Packet command execution completion report processing. The ATA command and the Packet command are received from the host device 101. Hereinafter, the ATA command and Packet command execution completion report processing will be described step by step with reference to FIG. 12.

Step 1201:. When the processing of the ATA command or the Packet command received from the host device 101 is completed, the system controller 105 confirms that the CMDINH bit in the ODC status register 608 is "0", the CMDEN bit is "1" and the CMDBSY bit is "0". Then, the system controller 105 sets the received ATA command processing result or Packet command processing result in the ODC command parameter storing register 606. The system controller 105 also sets, in the ODC command code storing register 605, a command code (0x31 in this example) representing the "STATSET" command provided by the optical disc controller 104 as a usual ODC command for requesting for command execution result report processing.

In this example, the value which is set by the system controller 105 in the ODC command parameter storing register 606 as the command execution result is 0x00 when the command execution is completed normally. When the command execution is completed with an error, a value indicating the error is set and 0x00 is not set. However, the values are arbitrary and are not limited to the above.

When the system controller 105 sets the command code in the ODC command code storing register 605, the CMDINH bit in the ODC status register 608 becomes "1" and an interrupt is generated to the optical disc controller 104.

Step 1202: The optical disc controller 104, which has received the interrupt, reads the ODC command code from the ODC command code storing register 605 by the system controller interface controlling section 502, and reads the command parameter from the ODC command parameter storing register 606.

The system controller interface controlling section 502 sets the CMDEN bit in the ODC status register 608 to "0" and the CMDBSY bit to "1". The system controller interface controlling section 502 also reports the command parameter to the host interface controlling section 501 for processing the received "STATSET" command. After reporting the command parameter, the system controller interface controlling section 502 clears the CMDINH bit in the ODC status register 608 to "0".

The host interface controlling section 501, which has received the command code and the command parameter from the system controller interface controlling section 502, executes processing corresponding to the received "STATSET" command.

Step 1203: The host interface controlling section 501 sets values in the error register 304 and the status register 301 in the ATA task file register 201, using the command execution result notified as the command parameter. For example, when the command execution result received as the command parameter is 0x00, i.e., when the command processing is completed normally, the ARBT bit in the error register 304 is cleared to "0", and the ERR bit and the BSY bit in the status register 301 are cleared to "0". When the command execution result received as the command parameter is not 0x00, i.e., when the command processing is completed with an error, the ARBT bit in the error register 304 and the ERR bit in the status register 301 are set to "1", and the BSY bit in the status register 301 is cleared to "0".

Step 1204: The host interface controlling section 501 sets an INTRQ output in the INTRQ control register 405 included in the host interface controlling register 202.

Step 1205: The host interface controlling section 501 notifies the system controller 105 that the "STATSET" command processing requested by the system controller 105 has been completed. For example, the host interface controlling section 501 sets the execution result of the "STATSET" command in the ODC command execution result storing register 607, and sets the CMDEN bit in the ODC status register 608 to "1". The host interface controlling section 501 also sets a bit corresponding to the "ODC command processing completion" interrupt factor in the interrupt factor register 603. Thus, an interrupt is generated to the system controller 105 from the optical disc controller 104.

At this point, the bit corresponding to the "ODC command processing completion" interrupt factor in the interrupt permitting register 604 in the system controller interface 112 indicates that the "ODC command processing completion" is permitted to interrupt.

Step 1206: The system controller 105, which has received the interrupt, confirms that the interrupt factor is the "ODC command processing completion" interrupt based on the interrupt factor register 603. The system controller 105 also reads the command execution result from the ODC command execution result storing register 607. Thus, the system controller 105 determines that the processing of the "STATSET" command as an ODC command has been completed.

When the system controller 105 reads the content in the ODC command execution result storing register 607 at this point, an interrupt is generated to the optical disc controller 104.

The optical disc controller 104, which has received the interrupt, clears the CMDBSY bit in the ODC status register 608 to "0" by the system controller interface controlling section 502.

The ATA/Packet command execution completion report processing to the host device 101 is realized by executing steps 1201 through 1206.

The "STATSET" command does not need to be a usual ODC command and may be a special ODC command, as long as the error register 304, the status register 301 and the like in the ATA task file register 201 are set and the INTRQ signal is output. Namely, it is not necessary to set the execution result of the "STATSET" command in the ODC command execution result storing register 607 after the "STATSET" command processing is completed and to issue a usual ODC command processing completion interrupt to the system controller 105.

1.2.6 ATA Command: "Identify Packet Device" Command Processing

Figure 13:
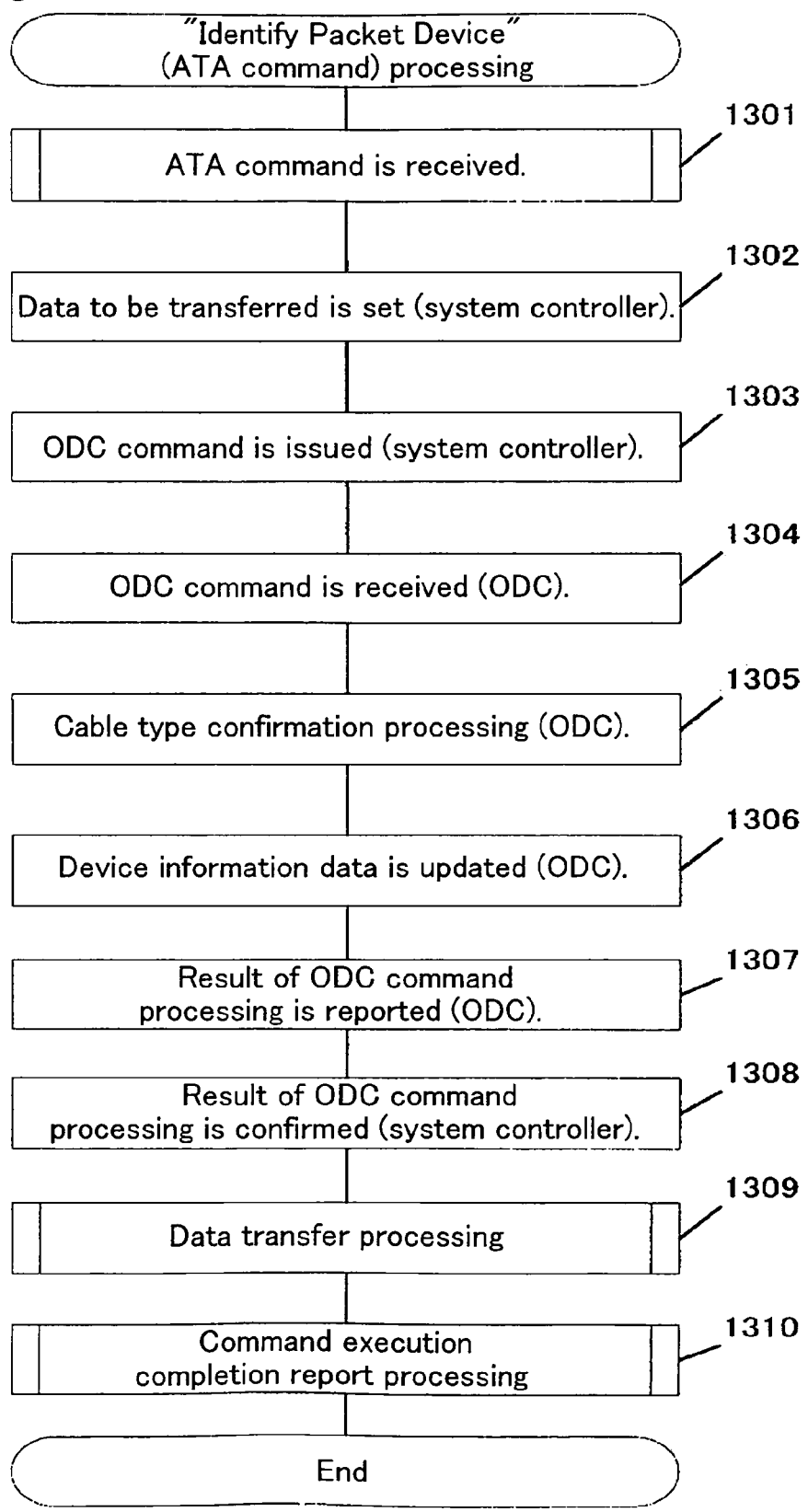
FIG. 13 is a flowchart illustrating a procedure of processing an ATA command: "Identify Packet Device" command which is to be transferred by the optical disc drive apparatus 102 to the host device 101.

FIG. 13 shows a flow of ATA command: "Identify Packet Device" command processing. The "Identify Packet Device" is used by the optical disc drive apparatus 102 to transfer device information to the host device 101. Hereinafter, the "Identify Packet Device" command processing will be described step by step with reference to FIG. 13. The device information to be transferred to the host device 101 has 512 bytes in total. Each byte or bit defined by the ATAPI Standard has a meaning. In this example, this information is held by the system controller 105.

Data indicating the device information does not need to be held by the system controller 105. It is sufficient as long as the data indicating the device information is held inside the optical disc drive apparatus 102.

Step 1301: The optical disc drive apparatus 102 receives the ATA command: "Identify Packet Device" command (command code: 0xA1) issued by the host device 101 in the same procedure as that described above in section 1.2.3 with reference to FIG. 10.

Step 1302: The system controller 105 in the optical disc drive apparatus 102, which has received the above-identified ATA command, sets the device information which is held by the system controller 105 and is to be transferred to the host device 101 in the buffer memory 115.

Step 1303: The system controller 105 requests the interface circuit to update the data stored in the buffer memory 115. For example, the system controller 105 confirms that the CMDINH bit in the ODC status register 608 is "0", the CMDEN bit is "1" and the CMDBSY bit is "0". Then, the system controller 105 sets, in the ODC command parameter storing register 606, information representing the start position of the device information on the buffer memory 115. The system controller 105 also sets, in the ODC command code storing register 605, a command code (0x33 in this example) representing the "IPDEV" command provided by the optical disc controller 104 as a usual ODC command for requesting update of the data for the "Identify Packet Device" command.

When the system controller 105 sets the command code in the ODC command code storing register 605, the CMDINH bit in the ODC status register 608 becomes "1" and an interrupt is generated to the optical disc controller 104.

Step 1304: The optical disc controller 104, which has received the interrupt, reads the ODC command code from the ODC command code storing register 605 by the system controller interface controlling section 502, and reads the command parameter from the ODC command parameter storing register 606.

The system controller interface controlling section 502 sets the CMDEN bit in the ODC status register 608 to "0" and the CMDBSY bit to "1". The system controller interface controlling section 502 also reports the command parameter to the host interface controlling section 501 for processing the received "IPDEV" command. After reporting the command parameter, the system controller interface controlling section 502 clears the CMDINH bit in the ODC status register 608 to "0".

The host interface controlling section 501, which has received the command code and the command parameter from the system controller interface controlling section 502, executes processing corresponding to the received "IPDEV" command.

Step 1305: The host interface controlling section 501 confirms the type of a cable in a connector section of the ATA bus 103 connected to the optical disc drive apparatus 102. For example, the host interface controlling section 501 determines whether the ATA bus 103 is formed of a 40-pin flat cable or an 80-pin flat cable by transmitting a signal through the cable.

Step 1306: In accordance with the request from the system controller 105 for data update processing, the optical disc controller controlling section 111 updates the data stored in the buffer memory 115. For example, the data is device information data requested by the host device 101 for identifying a prescribed device connected to the ATA bus 103. For example, the data is included in the device information data and may be variable data which cannot be fixed when the disc drive apparatus is produced.

For example, when the confirmation of the type of the cable is completed, the host interface controlling section 501 updates the device information which is set in the buffer memory 115 by the system controller 105. In more detail, data in the buffer memory 115 corresponding to information which is not included in the device information held by the system controller 105 is updated. Such data is, for example, information on the result of the confirmation of the type of the cable executed in step 1305, information on the result of the hardware reset processing immediately after the power is turned on, and information on the data transfer format which is set by a "Set Feature" command, which is an ATA command.

Step 1307: The optical disc controller controlling section 111 requests the system controller interface 112 to report to the system controller 105 that the data update processing has been completed. For example, when the data update processing of the data in the buffer memory 115 is completed, the host interface controlling section 501 notifies the system controller 105 that the "IPDEV" command processing requested by the system controller 105 has been completed.

In more detail, the host interface controlling section 501 sets the execution result of the "IPDEV" command in the ODC command execution result storing register 607, and sets the CMDEN bit in the ODC status register 608 to "1". The host interface controlling section 501 also sets a bit corresponding to the "ODC command processing completion" interrupt factor in the interrupt factor register 603. Thus, an interrupt is generated to the system controller 105 from the optical disc controller 104.

At this point, the bit corresponding to the "ODC command processing completion" interrupt factor in the interrupt permitting register 604 in the system controller interface 112 indicates that the "ODC command processing completion" is permitted to interrupt.

Step 1308: The system controller 105 confirms that the interrupt factor is the "ODC command processing completion" interrupt based on the interrupt factor register 603. The system controller 105 also reads the command execution result from the ODC command execution result storing register 607. Thus, the system controller 105 determines that the processing of the "IPDEV" command as an ODC command has been completed.

When the system controller 105 reads the content in the ODC command execution result storing register 607 at this point, an interrupt is generated to the optical disc controller 104.

The optical disc controller 104, which has received the interrupt, clears the CMDBSY bit in the ODC status register 608 to "0" by the system controller interface controlling section 502.

Step 1309: The system controller 105 requests the interface circuit to transfer the updated data to the host device 101. In accordance with the request from the system controller 105 for transfer of the updated data to the host device 101, the optical disc controller controlling section 111 requests the host interface 113 and the DMA controller 114 to transfer the updated data. For example, the optical disc drive apparatus 102 executes the "XBSND" processing in the same procedure as that described above in section 1.2.4 with reference to FIG. 11. Thus, the optical disc drive apparatus 102 transfers the device information data having 512 bytes in total in the memory buffer 115 to the host device 101.

Step 1310: Finally, the optical disc drive apparatus 102 executes the "STATSET" (ODC command) processing in the same procedure as that described above in section 1.2.5 with reference to FIG. 12. Thus, the optical disc drive apparatus 102 notifies the command processing result to the host device 101.

The optical disc drive apparatus 102 realizes the processing of the ATA command: "Identify Packet Device" command issued by the host device 101 by executing steps 1301 through 1310.

As described above, the data in the buffer memory 115 is updated by the optical disc controller 104, so that the processing load on the system controller 105 is alleviated and the speed of processing is increased.

By executing the update processing of data in the buffer memory 115 and the data transfer to the host device 101 by different ODC commands, the system controller 105 can confirm the content of the update of the device information data by the optical disc controller 104 before the data is transferred to the host device 101. Thus, the customization of the interface circuit is made easy.

When priority is put on increase of processing speed, the host interface controlling section 501 may continuously execute operations from the update of the data in the buffer memory 115 to the transfer of the data to the host device 101 using the "IPDEV" command (ODC command). It may be determined that the "IPDEV" command processing is completed when all such processing is completed. Even in this case, the system controller 105 can confirm the data in the buffer memory 115 and the content of the update of the device information data by the optical disc controller 104, although they are confirmed after the command processing is completed.

In the example shown in FIG. 13, step 1303 corresponds to the step of "requesting the interface circuit to update the data stored in the data buffer"; step 1306 corresponds to the step of "updating the data stored in the data buffer in accordance with the request from the system controller to update the data"; step 1307 corresponds to the step of "requesting the system interface communication section to report to the system controller that the update of the data has been completed"; and step 1309 corresponds to the step of "requesting the interface circuit to transfer the updated data to the upstream device" and the step of "requesting the host data transfer section and the buffer data transfer section to transfer the updated data to the upstream device in accordance with the request from the system controller to transfer the updated data to the upstream device".

However, the ATA command: "Identify Packet Device" command processing according to the present invention is not limited to that shown in FIG. 13. The ATA command: "Identify Packet Device" command processing may have an arbitrary procedure as long as the step of "requesting the interface circuit to update the data stored in the data buffer"; the step of "updating the data stored in the data buffer in accordance with the request from the system controller to update the data"; the step of "requesting the system interface communication section to report to the system controller that the update of the data has been completed"; the step of "requesting the interface circuit to transfer the updated data to the upstream device"; and the step of "requesting the host data transfer section and the buffer data transfer section to transfer the updated data to the upstream device in accordance with the request from the system controller to transfer the updated data to the upstream device" are realized.

1.2.7 Operation Method Setting Processing in a Single Drive Mode

The ATAPI Standard defines operations of a master device when the host device 101 accesses a slave device in the state where only the master device is connected to the ATA bus 103 and no slave device exists (single drive mode). Three operation methods are defined in total including those of the versions before ATA/ATAPI-6 version. They are summarized in 1) through 3) below.

1) Method 1
   The value read from the status register is the value in the register of the slave device.
   The values read from the other task file registers are the values in the registers of the master device.
   Data written in the command register of the slave device is ignored.

2) Method 2
   The values read from the error register and the status register are the values in the registers of the slave device.
   The values read from the other task file registers are the values in the registers of the master device.
   Write in the command register of the slave device accompanies the following operations:
   Set the ERR bit in the status register to "1", the BSY bit in the status register to "0", and the ABRT bit in the error register to nil,.

3) Method 3
   The values read from all the registers are the values in the registers of the slave device.
   Data written in the command register in the slave device is ignored.

In the ATA/ATAPI-6 Standard, Method 3 is defined as the default.

In order to comply with the operation methods, the host interface controlling register 202 includes the pseudo operation method control register 406 for, for example, issuing an ATA/Packet command to the slave device and setting operations generated by the access to the ATA task file register 201, and the pseudo task file register 407 for playing the role of the task file register for the slave device.

Figure 14:
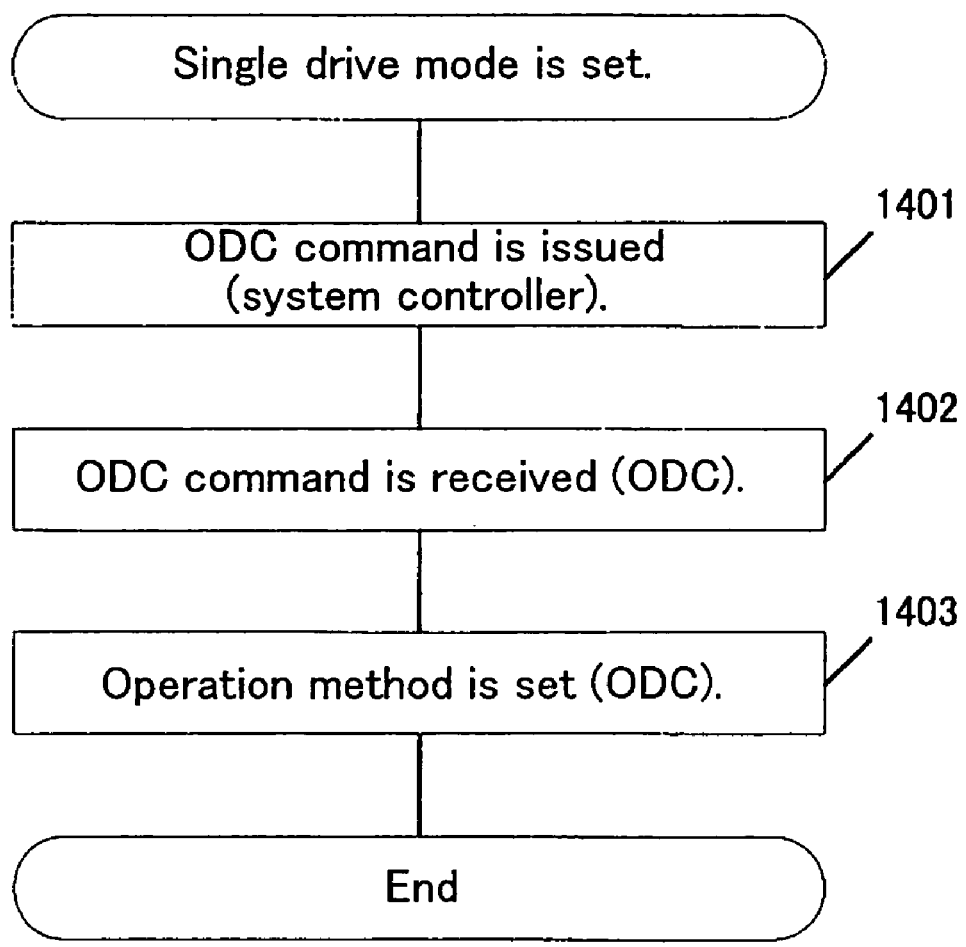
FIG. 14 is a flowchart illustrating an operation method setting processing procedure in a single drive mode.

FIG. 14 shows a flow of operation method setting processing in a single drive mode. Hereinafter, the operation method setting processing in the single drive mode will be described step by step with reference to FIG. 14.

Step 1401: The system controller 105 reports operation method information to the ATA/ATAPI interface circuit. The operation method in the single drive mode is set as follows, for example. The system controller 105 confirms that the CMDINH bit in the ODC status register 608 is "0". Then, the system controller 105 sets information corresponding to the single drive mode (operation method information) in the ODC command parameter storing register 606. The system controller 105 also sets, in the ODC command code storing register 605, a command code (0xE0 in this example) representing the "SETSGLMODE" command provided by the optical disc controller 104 as a special ODC command for setting an operation method in the single drive mode.

The operation method information represents, for example, an operation which is performed by the master device when an upstream device attempts to access the slave device in the state where the slave device is not connected to the ATA/ATAPI bus.

When the system controller 105 sets the command code in the ODC command code storing register 605, the CMDINH bit in the ODC status register 608 becomes "1" and an interrupt is generated to the optical disc controller 104.

Step 1402: The optical disc controller controlling section 111 requests the system controller interface 112 to receive the operation method information which is reported by the system controller 105. For example, the optical disc controller 104, which has received the interrupt, reads the ODC command code from the ODC command code storing register 605 by the system controller interface controlling section 502, and reads the command parameter from the ODC command parameter storing register 606. Then, the optical disc controller 104 notifies the host interface controlling section 501, for controlling the processing of the received "SETSGLMODE" command, of such data.

Step 1403: Based on the operation method information, the optical disc controller controlling section 111 sets a value held by the pseudo task file register 407. This value is a value regarding the operation method information (for example, a value representing the state of the slave device). For example, the host interface controlling section 501, which has received the command code and the command parameter from the system controller interface controlling section 502, reads the operation method (operation method information) in the single drive mode from the received command parameter. Based on the read operation method information, the host interface controlling section 501, for example, sets the operation method in the case where a command is issued by the host device 101 to the slave device in the pseudo operation method control register 406 and the pseudo task file register 407. In more detail, when Method 3 is specified as the operation method, the host interface controlling section 501 ignores the command issued to the slave device. The host interface controlling section 501 sets the pseudo operation method control register 406 such that when an ATA task file register of the slave device is accessed, a value in the pseudo task file register 407 is the value in pseudo operation method control register 406. The host interface controlling section 501 also sets such a value in the pseudo task file register 407.

After step 1403 is executed, the system controller interface controlling section 502 clears the CMDINH bit in the ODC status register 608 to "0".

The optical disc drive apparatus 102 sets the operation method in the single drive mode by executing steps 1401 through 1403.

The optical disc controller 104 provides the system controller 105 with a command for setting the operation method in the single drive mode by executing steps 1401 through 1403. As a result, the customization of the interface circuit by the system controller 105 is made easy.

In the example shown in FIG. 14, step 1401 corresponds to the step of "reporting the operation method information to the ATA/ATAPI interface circuit"; step 1402 corresponds to the step of "requesting the system interface communication section to receive the operation method information reported by the system controller; and step 1403 corresponds to the step of "setting a value to be held by the pseudo task file register based on the operation method information".

However, the operation method setting processing in a single drive mode according to the present invention is not limited to that shown in FIG. 14. The operation method setting processing in a single drive mode may have an arbitrary procedure as long as the step of "reporting the operation method information to the ATA/ATAPI interface circuit"; the step of "requesting the system interface communication section to receive the operation method information reported by the system controller; and the step of "setting a value to be held by the pseudo task file register based on the operation method information" are realized.

The command names and command codes are not limited to those used in the first example and may be arbitrary. The first example has been described with respect to the ATAPI Standard protocol processing, but the protocol processing does not need to be conformed to the ATAPI Standard according to the present invention.

EXAMPLE 2

2.1. System Structure

Figure 16:
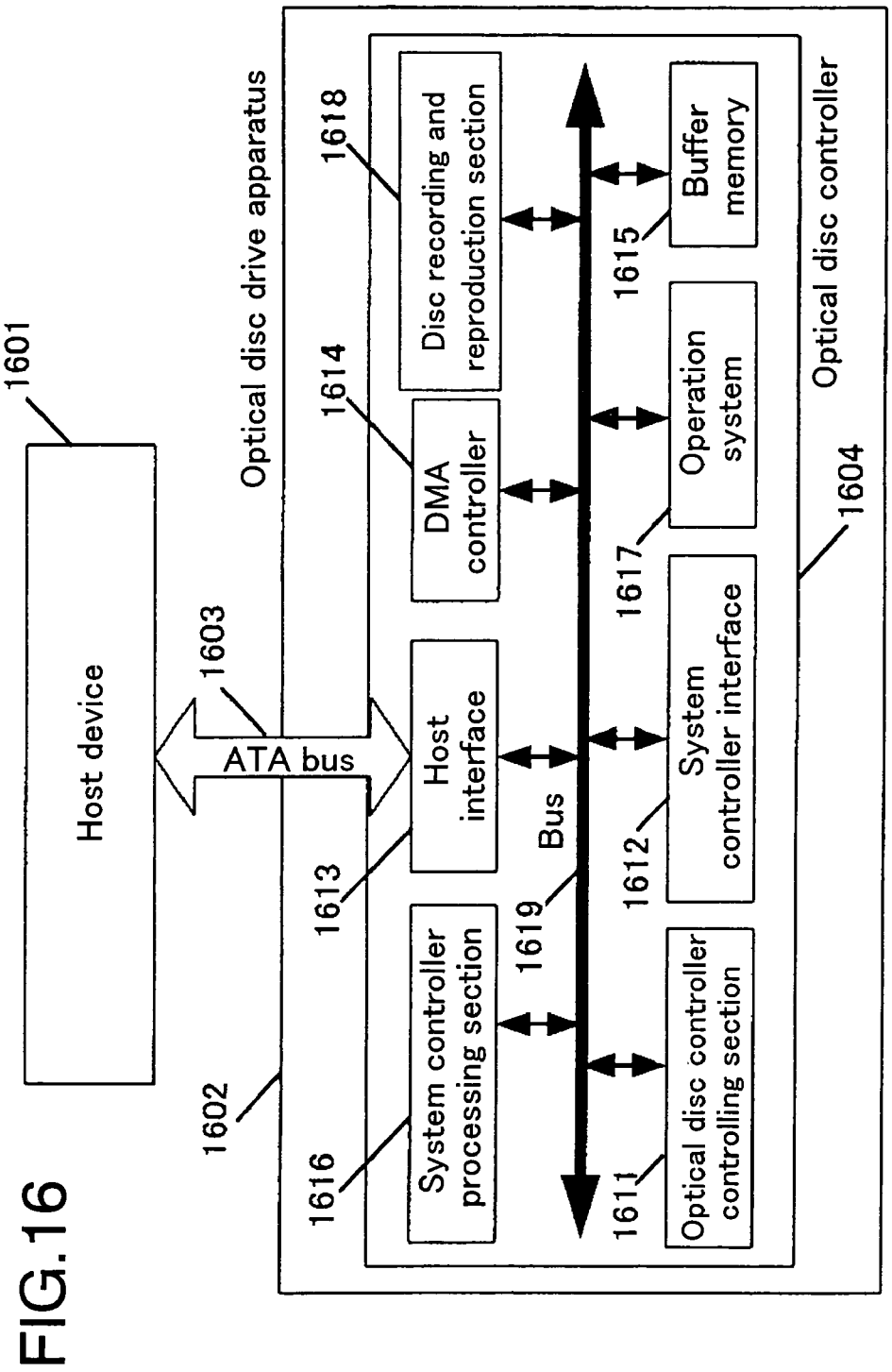
FIG. 16 shows a structure of an optical disc drive apparatus 1602 according to a second example of the present invention.

FIG. 16 shows a structure of an optical disc drive apparatus 1602 according to a second example of the present invention.

The optical disc drive apparatus 1602 is connected to an ATA bus 1603 as a main connection device. The bus 1603 is also connected to a host device 1601 (for example, a personal computer).

The optical disc drive apparatus 1602 includes an optical disc controller 1604 for, for example, performing data read from and data write to an optical disc and performing communication with the host device 1601 and performing communication with the host device 101.

The optical disc controller 1604 includes an optical disc controller controlling section 1611, a system controller interface 1612, a host interface 1613, a DMA controller 1614, a buffer memory 1615, a system controller processing section 1616, an operation system 1617, a disc recording and reproduction section 1618, and a bus 1619. The optical disc controller controlling section 1611, the system controller interface 1612, the host interface 1613, the DMA controller 1614, the buffer memory 1615, the system controller processing section 1616, the operation system 1617, and the disc recording and reproduction section 1618 access each other via the bus 1619.

The functions of the optical disc controller controlling section 1611, the system controller interface 1612, the host interface 1613, the DMA controller 1614, the buffer memory 1615, and the disc recording and reproduction section 1618 are respectively the same as those of the corresponding elements described in the first example, and will not be described in detail here.

In this example, the host interface 1613 is accessible only from the optical disc controller controlling section 1611 and is not accessible from the system controller processing section 1616.

In this example, the buffer memory 1615 is built in the optical disc controller 1604, but does not need to be built in the optical disc controller 1604. The buffer memory 1615 may be located anywhere as long being capable of saving and storing data, for example, data to be recorded on the optical disc and data read from the optical disc. For example, the buffer memory 1615 may be built in the optical disc drive apparatus 1602 but outside the optical disc controller 1604.

The system controller processing section 1616 is a processing section for controlling the entirety of the optical disc drive apparatus 1602 and plays the same role as that of the system controller 105 in the first example. The system controller processing section 1616 operates using a CPU included in the optical disc controller 1604. Namely, the optical disc controller 1604 is an LSI capable of mounting therein the system controller 105 described in the first example.

The system controller processing section 1616 can access only the system controller interface 1612 and the buffer memory 1615 like the system controller 105 in the first example, but may additionally access the other elements.

The operation system 1617 is, for example, µITRON provided by TRON Association, ITRON Project. In the first example, all the notifications on occurrence of events between the optical disc controller 104 and the system controller 105 are performed using an interrupt. In the second example, the optical disc controller 1604 includes the system controller processing section 1616, and thus an interrupt is not used. In the second example, the functions of the optical disc controller controlling section 1611 and the system controller processing section 1616 may be realized as tasks. The operation system 1617 is used to notify the occurrence of events between the optical disc controller controlling section 1611 and the system controller processing section 1616 using an event flag. This is one of the differences between the first example and the second example.

In the second example, a method for executing command processing using the operation system 1617 will be described. The present invention does not necessarily require the function of the operation system 1617. For example, command processing may be executed by simply using a flag as software. With such a method, a factor is determined to be generated by polling the flag.

2.2 Operation of the Optical Disc Drive Apparatus 1602

Hereinafter, a method for realizing the ATAPI Standard protocol processing, a method for realizing customization, and the like using the optical disc drive apparatus 1602 will be described.

In the second example, operations regarding ODC commands for operation control between the host device 1601 and the optical disc controller 1604 will be described. Hereinafter, the phrase "ODC commands" refers to host-related ODC commands unless otherwise defined.

2.2.1 Reset Protocol Processing

Hereinafter, the reset protocol processing using the optical disc drive apparatus 1602 in the second example will be described with reference to FIG. 9. The reset protocol processing in the second example is the same as that described above in section 1.2.1 in the first example except for step 903, and the steps other than step 903 will not be described here.

Step 903: The optical disc controller controlling section 1611 requests the system controller interface 161:2 to request the system controller processing 1616 to permit execution of the second reset processing, which is different from the first reset processing. For example, a host interface controlling section 501 in the optical disc controller controlling section 1611 requests the system controller processing section 1616 to execute self-diagnostic testing of the optical disc drive apparatus 1602 and to report the result of the self-diagnostic testing of the optical disc drive apparatus 1602. When the host interface controlling section 501 makes the above request, an event flag is used instead of an interrupt.

The host interface controlling section 501 performs notifications to the system controller processing section 1616 using a "factor generation" event. For detailed factor information, the host interface controlling section 501 sets, in an interrupt factor register 603 in the system controller interface 1612, a bit corresponding to a "self-diagnostic testing execution request" factor, like in the first example. The system controller processing section 1616 obtains the detailed factor information from the interrupt factor register 603.

2.2.2 Packet Command Receipt from the Host Device

Hereinafter, the Packet command receipt processing of the optical disc drive apparatus 1602 in the second example will be described with reference to FIG. 10. The Packet command receipt processing in the second example is the same as that described above in section 1.2.2 in the first example except for step 1004, and the steps other than step 1004 will not be described here.

Step 1004: The host interface controlling section 501 notifies the system controller processing section 1616 that the command has been received from the host device 1601. For example when the host interface controlling section 501 makes the above notification, an event flag is used instead of an interrupt.

The host interface controlling section 501 performs notifications to the system controller processing section 1616 using a "factor generation" event. For detailed factor information, the host interface controlling section 501 sets, in the interrupt factor register 603, a bit corresponding to a "command receipt from the host device" factor, like in the first example. The system controller processing section 1616 obtains the detailed factor information from the interrupt factor register 603.

2.2.3 ATA Command Receipt from the Host Device

Still with reference to FIG. 10, the ATA command receipt processing of the optical disc drive apparatus 1602 in the second example when an ATA command is received from the host device 1601 will be described. The ATA command receipt processing in the second example is the same as that described above in section 1.2.3 in the first example except for step 1004, and the steps other than step 1004 will not be described here.

Step 1004: The host interface controlling section 501 notifies the system controller processing section 1616 that the command has been received from the host device 1601. For example when the host interface controlling section 501 makes the above notification, an event flag is used instead of an interrupt.

The host interface controlling section 501 performs notifications to the system controller processing section 1616 using a "factor generation" event. For detailed factor information, the host interface controlling section 501 sets, in the interrupt factor register 603, a bit corresponding to a "command receipt from the host device" factor, like in the first example. The system controller processing section 1616 obtains the detailed factor information from the interrupt factor register 603.

2.2.4 Data Transfer Processing

Hereinafter, the data transfer processing performed by the optical disc drive apparatus 1602 in the second example with the host device 1601 via the ATA bus 1603 will be described with reference to FIG. 11. The data transfer processing in the second example is the same as that described above in section 1.2.4 in the first example except for step 1108, and the steps other than step 1108 will not be described here.

Step 1108: The optical disc controller controlling section 1611 reports the result of command execution to the system controller processing section 1616. For example, the host interface controlling section 501 notifies the system controller processing section 1616 that the ODC command processing requested by the system controller processing section 1616 has been completed. When the host interface controlling section 501 makes the above notification, an event flag is used instead of an interrupt. Except for the use of the event flag, the procedure in step 1108 in this example is the same as that described in the first example in section 1.2.4.

The host interface controlling section 501 performs notifications to the system controller processing section 1616 using a "factor generation" event. For detailed factor information, the host interface controlling section 501 sets, in the interrupt factor register 603, a bit corresponding to an "ODC command processing completion" factor, like in the first example. The system controller processing section 1616 obtains the detailed factor information from the interrupt factor register 603.

2.2.5 ATA/Packet Command Execution Completion Report Processing to the Host Device Hereinafter, the ATA command and Packet command execution completion report processing in the second example will be described with reference to FIG. 12. The ATA command and Packet command execution completion report processing in the second example is the same as that described above in section 1.2.5 in the first example except for step 1205, and the steps other than step 1205 will not be described here.

Step 1205: The host interface controlling section 501 notifies the system controller processing section 1616 that the "STATSET" command (usual ODC command) processing requested by the system controller processing section 1616 has been completed. When the interface controlling section 501 makes the above notification, an event flag is used instead of an interrupt. Except for the use of the event flag, the procedure in step 1205 in this example is the same as that described in the first example in section 1.2.5.

The host interface controlling section 501 performs notifications to the system controller processing section 1616 using a "factor generation" event. For detailed factor information, the host interface controlling section 501 sets, in the interrupt factor register 603, a bit corresponding to an "ODC command processing completion" factor, like in the first example. The system controller processing section 1616 obtains the detailed factor information from the interrupt factor register 603.

2.2.6 ATA Command: "Identify Packet Device" Command Processing

Hereinafter, the "Identify Packet Device" command processing in the second example will be described with reference to FIG. 13. The "Identify Packet Device" command processing in the second example is the same as that described above in section 1.2.6 in the first example except for step 1307, and the steps other than step 1307 will not be described here.

Step 1307: The optical disc controller controlling section 1611 requests the system controller interface 1612 to report to the system controller processing section 1616 that the data update processing has been completed. For example, when the data update processing of the data in the buffer memory 1615 is completed, the host interface controlling section 501 notifies the system controller processing section 1616 that the "IPDEV" command processing requested by the system controller processing section 1616 has been completed. When the host interface controlling section 501 makes the above notification, an event flag is used instead of an interrupt. Except for the use of the event flag, the procedure in step 1307 in this example is the same as that described in the first example in section 1.2.6.

The host interface controlling section 501 performs notifications to the system controller processing section 1616 using a "factor generation" event. For detailed factor information, the host interface controlling section 501 sets, in the interrupt factor register 603, a bit corresponding to an "ODC command processing completion" factor, like in the first example. The system controller processing section 1616 obtains the detailed factor information from the interrupt factor register 603.

2.2.7 Operation Method Setting Processing in a Single Drive Mode

The operation method setting processing in a single drive mode in the second example is the same as that described in the first example in section 1.2.7 and will not be described here.

The optical disc drive apparatus 1602 according to the second example of the present invention includes a system controller processing section in the optical disc controller 1604, so that the optical disc controller 1604 is realized by one LSI. Thus, optical disc drive apparatus 1602 can be produced with reduced cost. In addition, as in the first example, the customization of the interface circuit by a system controller is easily executed, and the load on system controller development is alleviated.

In the second example, notifications on generation of events between the optical disc controller controlling section 1611 and the system controller processing section 1616 are performed using an event flag, and the interrupt factor register 603 is used for obtaining detailed factor information. Such detailed factors may be each treated as a separate event and notified using an event flag. Such a case provides substantially the same effect as that of the second example without requiring the interrupt factor register 603 or the interrupt permitting register 604 in the system controller interface 1612.

The first and second examples are described using an optical disc drive apparatus. Any disc drive apparatus which is connected with a host device via an ATA bus can provide substantially the same effect as that of the optical disc drive apparatus.

In the first and second examples, the ATA bus is used as a bus and an ATA/ATAPI interface is used as an interface. Even when using an interface not conforming to the ATA/ATAPI Standard, substantially the same effect is provided.

The command names and command codes are not limited to those used in the first example and may be arbitrary.

According to the present invention, the system controller is allowed to access the interface circuit for realizing the customization of the interface circuit by the system controller. Therefore, the ATAPI Standard protocol processing is automatically executed and the load on system controller development is alleviated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An interface circuit for performing communication with an upstream device and with a system controller for controlling a disc drive apparatus, the interface circuit comprising:
   an interface communication section for performing communication with the upstream device;
   a system interface communication section for performing communication with the system controller; and
   an interface control section for controlling the interface communication section and the system interface communication section;
   wherein the interface control section includes:
   (a) a first execution section for executing first reset processing;
   (b) a first request section for requesting the system interface communication section to request the system controller to permit execution of second reset processing which is different from the first reset processing;
   (c) a second request section for requesting the system interface communication section to receive a report of the permission of the execution of the second reset processing from the system controller;
   (d) a second execution section for executing the second reset processing in accordance with the report of the permission of the execution of the second reset processing; and
   (e) a third request section for requesting the interface communication section to report completion of the second reset processing to the upstream device.

2. An interface circuit according to claim 1, wherein the interface communication section performs communication with the upstream device via a bus.

3. An interface circuit according to claim 2, wherein:
   the bus is an ATA/ATAPI bus,
   the interface communication section is an ATA/ATAPI task file register, and
   the interface circuit is an ATA/ATAPI interface circuit.

4. An interface circuit according to claim 3, wherein:
   the first reset processing does not include prescribed processing on self-diagnostic testing,
   the second reset processing includes the prescribed processing on self-diagnostic testing, and
   the self-diagnostic testing is processing for detecting an abnormality inside the disc drive apparatus.

5. A disc controller, comprising:
   a disc recording and reproduction control section for performing data recording to and data reproduction from a disc; and
   an interface circuit for performing communication with an upstream device and with a system controller for controlling a disc drive apparatus;
   wherein the interface circuit includes:
   an interface communication section for performing communication with the upstream device;
   a system interface communication section for performing communication with the system controller; and
   an interface control section for controlling the interface communication section and the system interface communication section;
   wherein the interface control section includes:

(a) a first execution section for executing first reset processing;

(b) a first request section for requesting the system interface communication section to request the system controller to permit execution of second reset processing which is different from the first reset processing;

(c) a second request section for requesting the system interface communication section to receive a report of the permission of the execution of the second reset processing from the system controller;

(d) a second execution section for executing the second reset processing in accordance with the report of the permission of the execution of the second reset processing; and (e) a third request section for requesting the interface communication section to report completion of the second reset processing to the upstream device.

6. A disc controller according to claim 5, wherein the interface communication section performs communication with the upstream device via a bus.

7. A disc controller according to claim 6, wherein:
the bus is an ATA/ATAPI bus,
the interface communication section is an ATA/ATAPI task file register, and
the interface circuit is an ATA/ATAPI interface circuit.

8. A disc controller according to claim 7, wherein:
the first reset processing does not include prescribed processing on self-diagnostic testing,
the second reset processing includes the prescribed processing on self-diagnostic testing, and
the self-diagnostic testing is processing for detecting an abnormality inside the disc drive apparatus.

9. A disc drive apparatus, comprising:
an interface circuit for performing communication with an upstream device and with a system controller; and
the system controller;
wherein the interface circuit includes:
an interface communication section for performing communication with the upstream device;
a system interface communication section for performing communication with the system controller; and
an interface control section for controlling the interface communication section and the system interface communication section,
wherein the interface control section includes:

(a) a first execution section for executing first reset processing;

(b) a first request section for requesting the system interface communication section to request the system controller to permit execution of second reset processing which is different from the first reset processing;

(c) a second request section for requesting the system interface communication section to receive a report of the permission of the execution of the second reset processing from the system controller;

(d) a second execution section for executing the second reset processing in accordance with the report of the permission of the execution of the second reset processing; and (e) a third request section for requesting the interface communication section to report completion of the second reset processing to the upstream device;

wherein the system controller reports the permission of the execution of the second reset processing to the interface circuit.

10. A disc drive apparatus according to claim 9, wherein the interface communication section performs communication with the upstream device via a bus.

11. A disc drive apparatus according to claim 10, wherein:
the bus is an ATA/ATAPI bus,
the interface communication section is an ATA/ATAPI task file register, and
the interface circuit is an ATA/ATAPI interface circuit.

12. A disc drive apparatus according to claim 11, wherein:
the first reset processing does not include prescribed processing on self-diagnostic testing,
the second reset processing includes the prescribed processing on self-diagnostic testing, and
the self-diagnostic testing is processing for detecting an abnormality inside the disc drive apparatus.

13. A disc drive apparatus, comprising:
a disc controller; and
a system controller;
wherein the disc controller includes:
a disc recording and reproduction control section for performing data recording to and data reproduction from a disc; and
an interface circuit for performing communication with an upstream device and with a system controller;
wherein the interface circuit includes:
an interface communication section for performing communication with the upstream device;
a system interface communication section for performing communication with the system controller; and
an interface control section for controlling the interface communication section and the system interface communication section;
wherein the interface control section includes:

(a) a first execution section for executing first reset processing;

(b) a first request section for requesting the system interface communication section to request the system controller to permit execution of second reset processing which is different from the first reset processing;

(c) a second request section for requesting the system interface communication section to receive a report of the permission of the execution of the second reset processing from the system controller;

(d) a second execution section for executing the second reset processing in accordance with the report of the permission of the execution of the second reset processing; and (e) a third request section for requesting the interface communication section to report completion of the second reset processing to the upstream device;

wherein the system controller reports the permission of the execution of the second reset processing to the interface circuit.

14. A disc drive apparatus according to claim 13, wherein the interface communication section performs communication with the upstream device via a bus.

15. A disc drive apparatus according to claim 14, wherein:
the bus is an ATA/ATAPI bus,
the interface communication section is an ATA/ATAPI task file register, and
the interface circuit is an ATA/ATAPI interface circuit.

16. A disc drive apparatus according to claim 15, wherein:
the first reset processing does not include prescribed processing on self-diagnostic testing,
the second reset processing includes the prescribed processing on self-diagnostic testing, and the self-diagnostic testing is processing for detecting an abnormality inside the disc drive apparatus.

17. An interface control method, in an interface circuit for performing communication with an upstream device and with a system controller for controlling a disc drive apparatus, for controlling an interface communication section for performing communication with the upstream device and a system interface communication section for performing communication with the system controller, the interface control method comprising the steps of:
    (a) executing first reset processing;
    (b) requesting the system interface communication section to request the system controller to permit execution of second reset processing which is different from the first reset processing;
    (c) requesting the system interface communication section to receive a report of the permission of the execution of the second reset processing from the system controller;
    (d) executing the second reset processing in accordance with the report of the permission of the execution of the second reset processing; and
    (e) requesting the interface communication section to report completion of the second reset processing to the upstream device.

18. An interface control method according to claim 17, wherein the interface communication section performs communication with the upstream device via a bus.

19. An interface control method according to claim 18, wherein:
    the bus is an ATA/ATAPI bus,
    the interface communication section is an ATA/ATAPI task file register, and
    the interface circuit is an ATA/ATAPI interface circuit.

20. An interface control method according to claim 19, wherein:
    the first reset processing does not include prescribed processing on self-diagnostic testing,
    the second reset processing includes the prescribed processing on self-diagnostic testing, and
    the self-diagnostic testing is processing for detecting an abnormality inside the disc drive apparatus.

21. An interface control method, in a disc controller including a disc recording and reproduction control section for performing data recording to and data reproduction from a disc, and an interface circuit for performing communication with an upstream device and with a system controller for controlling a disc drive apparatus, for controlling an interface communication section for performing communication with the upstream device and a system interface communication section for performing communication with the system controller, the interface control method comprising the steps of:
    (a) executing first reset processing;
    (b) requesting the system interface communication section to request the system controller to permit execution of second reset processing which is different from the first reset processing;
    (c) requesting the system interface communication section to receive a report of the permission of the execution of the second reset processing from the system controller;
    (d) executing the second reset processing in accordance with the report of the permission of the execution of the second reset processing; and
    (e) requesting the interface communication section to report completion of the second reset processing to the upstream device.

22. An interface control method according to claim 21, wherein the interface communication section performs communication with the upstream device via a bus.

23. An interface control method according to claim 22, wherein:
    the bus is an ATA/ATAPI bus,
    the interface communication section is an ATA/ATAPI task file register, and
    the interface circuit is an ATA/ATAPI interface circuit.

24. An interface control method according to claim 23, wherein:
    the first reset processing does not include prescribed processing on self-diagnostic testing,
    the second reset processing includes the prescribed processing on self-diagnostic testing, and
    the self-diagnostic testing is processing for detecting an abnormality inside the disc drive apparatus.

25. An interface control method, in a disc drive apparatus including an interface circuit for performing communication with an upstream device and with a system controller, and the system controller, for controlling an interface communication section for performing communication with the upstream device and a system interface communication section for performing communication with the system controller, the interface control method comprising the steps of:
    (a) executing first reset processing;
    (b) requesting the system interface communication section to request the system controller to permit execution of second reset processing which is different from the first reset processing;
    (c) reporting the permission of the execution of the second reset processing to the interface circuit;
    (d) requesting the system interface communication section to receive a report of the permission of the execution of the second reset processing from the system controller;
    (e) executing the second reset processing in accordance with the report of the permission of the execution of the second reset processing; and
    (f) requesting the interface communication section to report completion of the second reset processing to the upstream device;
    wherein the system controller reports the permission of the execution of the second reset processing to the interface circuit.

26. An interface control method according to claim 25, wherein the interface communication section performs communication with the upstream device via a bus.

27. An interface control method according to claim 26, wherein:
    the bus is an ATA/ATAPI bus,
    the interface communication section is an ATA/ATAPI task file register, and
    the interface circuit is an ATA/ATAPI interface circuit.

28. An interface control method according to claim 27, wherein:
    the first reset processing does not include prescribed processing on self-diagnostic testing,
    the second reset processing includes the prescribed processing on self-diagnostic testing, and
    the self-diagnostic testing is processing for detecting an abnormality inside the disc drive apparatus.

29. An interface control method, in a disc drive apparatus including a disc controller and a system controller, for controlling an interface communication section for performing communication with an upstream device and with a system interface communication section for performing communication with the system controller;
the disc controller including:
a disc recording and reproduction control section for performing data recording to and data reproduction from a disc; and
an interface circuit for performing communication with the upstream device and the system controller; and
the interface control method comprising the steps of:
(a) executing first reset processing;
(b) requesting the system interface communication section to request the system controller to permit execution of second reset processing which is different from the first reset processing;
(c) reporting the permission of the execution of the second reset processing to the interface circuit;
(d) requesting the system interface communication section to receive a report of the permission of the execution of the second reset processing from the system controller;
(e) executing the second reset processing in accordance with the report of the permission of the execution of the second reset processing; and
(f) requesting the interface communication section to report completion of the second reset processing to the upstream device;
wherein the system controller reports the permission of the execution of the second reset processing to the interface circuit.

30. An interface control method according to claim 29, wherein the interface communication section performs communication with the upstream device via a bus.

31. An interface control method according to claim 30, wherein:
the bus is an ATA/ATAPI bus,
the interface communication section is an ATA/ATAPI task file register, and
the interface circuit is an ATA/ATAPI interface circuit.

32. An interface control method according to claim 31, wherein:
the first reset processing does not include prescribed processing on self-diagnostic testing,
the second reset processing includes the prescribed processing on self-diagnostic testing, and
the self-diagnostic testing is processing for detecting an abnormality inside the disc drive apparatus.

33. An interface circuit for performing communication with an upstream device and with a system controller for controlling a disc drive apparatus, the interface circuit comprising:
a host data transfer section for performing data transfer with the upstream device;
a buffer data transfer section for performing data transfer with a data buffer;
a system interface communication section for performing communication with the system controller; and
an interface control section for controlling the host data transfer section, the buffer data transfer section, and the system interface communication section;
wherein:
the data buffer stores data;
the system controller requests the interface circuit to perform data transfer between the upstream device and the data buffer; and
the interface control section includes:
(a) a first request section for requesting the host data transfer section to perform data transfer between the upstream device and the host data transfer section in accordance with the request from the system controller to perform data transfer between the upstream device and the data buffer;
(b) a second request section for requesting the buffer data transfer section to perform data transfer between the data buffer and the buffer data transfer section in accordance with the request from the system controller to perform data transfer between the upstream device and the data buffer; and
(c) a determination section for determining whether the data transfer between the upstream device and the data buffer has been completed or not based on a report from the host data transfer section on the data transfer and a report from the buffer data transfer section on the data transfer.

34. An interface circuit according to claim 33, wherein:
the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer; and
when the data transfer between the upstream device and the host data transfer section has been completed and the data transfer between the data buffer and the buffer data transfer section has been completed, the determination section determines that the data transfer between the upstream device and the data buffer has been completed.

35. An interface circuit according to claim 33, wherein the host data transfer section performs data transfer with the upstream device via a bus.

36. An interface circuit according to claim 35, wherein:
the bus is an ATA/ATAPI bus, and
the interface circuit is an ATA/ATAPI interface circuit.

37. A disc controller, comprising:
a disc recording and reproduction control section for performing data recording to and data reproduction from a disc; and
an interface circuit for performing communication with an upstream device and with a system controller for controlling a disc drive apparatus;
wherein the interface circuit includes:
a host data transfer section for performing data transfer with the upstream device;
a buffer data transfer section for performing data transfer with a data buffer;
a system interface communication section for performing communication with the system controller; and
an interface control section for controlling the host data transfer section, the buffer data transfer section, and the system interface communication section;
wherein:
the data buffer stores data;
the system controller requests the interface circuit to perform data transfer between the upstream device and the data buffer; and
the interface control section includes:

(a) a first request section for requesting the host data transfer section to perform data transfer between the upstream device and the host data transfer section in accordance with the request from the system controller to perform data transfer between the upstream device and the data buffer;

(b) a second request section for requesting the buffer data transfer section to perform data transfer between the data buffer and the buffer data transfer section in accordance with the request from the system controller to perform data transfer between the upstream device and the data buffer; and (c) a determination section for determining whether the data transfer between the upstream device and the data buffer has been completed or not based on a report from the host data transfer section on the data transfer and a report from the buffer data transfer section on the data transfer.

38. A disc controller according to claim 37, wherein:
the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer; and when the data transfer between the upstream device and the host data transfer section has been completed and the data transfer between the data buffer and the buffer data transfer section has been completed, the determination section determines that the data transfer between the upstream device and the data buffer has been completed.

39. A disc controller according to claim 37, wherein the host data transfer section performs data transfer with the upstream device via a bus.

40. A disc controller according to claim 39, wherein:
the bus is an ATA/ATAPI bus, and
the interface circuit is an ATA/ATAPI interface circuit.

41. A disc drive apparatus, comprising:
an interface circuit for performing communication with an upstream device and with a system controller;
a data buffer capable of storing data; and
the system controller;
wherein the interface circuit includes:
a host data transfer section for performing data transfer with the upstream device;
a buffer data transfer section for performing data transfer with the data buffer;
a system interface communication section for performing communication with the system controller; and
an interface control section for controlling the host data transfer section, the buffer data transfer section, and the system interface communication section;
wherein:
the system controller requests the interface circuit to perform data transfer between the upstream device and the data buffer; and
the interface control section includes:
(a) a first request section for requesting the host data transfer section to perform data transfer between the upstream device and the host data transfer section in accordance with the request from the system controller to perform data transfer between the upstream device and the data buffer;

(b) a second request section for requesting the buffer data transfer section to perform data transfer between the data buffer and the buffer data transfer section in accordance with the request from the system controller to perform data transfer between the upstream device and the data buffer; and (c) a determination section for determining whether the data transfer between the upstream device and the data buffer has been completed or not based on a report from the host data transfer section on the data transfer and a report from the buffer data transfer section on the data transfer.

42. A disc drive apparatus according to claim 41, wherein:
the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer; and when the data transfer between the upstream device and the host data transfer section has been completed and the data transfer between the data buffer and the buffer data transfer section has been completed, the determination section determines that the data transfer between the upstream device and the data buffer has been completed.

43. A disc drive apparatus according to claim 41, wherein the host data transfer section performs data transfer with the upstream device via a bus.

44. A disc drive apparatus according to claim 43, wherein:
the bus is an ATA/ATAPI bus, and
the interface circuit is an ATA/ATAPI interface circuit.

45. A disc drive apparatus, comprising:
a disc controller;
a data buffer capable of storing data; and
a system controller;
wherein the disc controller includes:
a disc recording and reproduction control section for performing data recording to and data reproduction from a disc; and
an interface circuit for performing communication with an upstream device and with a system controller;
wherein the interface circuit includes:
a host data transfer section for performing data transfer with the upstream device;
a buffer data transfer section for performing data transfer with the data buffer;
a system interface communication section for performing communication with the system controller; and
an interface control section for controlling the host data transfer section, the buffer data transfer section, and the system interface communication section;
wherein:
the system controller requests the interface circuit to perform data transfer between the upstream device and the data buffer; and
the interface control section includes:
(a) a first request section for requesting the host data transfer section to perform data transfer between the upstream device and the host data transfer section in accordance with the request from the system controller to perform data transfer between the upstream device and the data buffer;

(b) a second request section for requesting the buffer data transfer section to perform data transfer between the data buffer and the buffer data transfer section in accordance with the request from the system controller to perform data transfer between the upstream device and the data buffer; and (c) a determination section for determining whether the data transfer between the upstream device and the data buffer has been completed or not based on a report from the host data transfer section on the data transfer and a report from the buffer data transfer section on the data transfer.

46. A disc drive apparatus according to claim 45, wherein:
the determination section includes: a section for determining whether the data transfer between the upstream device and the host data transfer section has been completed or not based on a report from the host data transfer section on the data transfer, and a section for determining whether the data transfer between the data buffer and the buffer data transfer section has been completed or not based on a report from the buffer data transfer section on the data transfer; and
when the data transfer between the upstream device and the host data transfer section has been completed and the data transfer between the data buffer and the buffer data transfer section has been completed, the determination section determines that the data transfer between the upstream device and the data buffer has been completed.

47. A disc drive apparatus according to claim 45, wherein the host data transfer section performs data transfer with the upstream device via a bus.

48. A disc drive apparatus according to claim 47, wherein:
the bus is an ATA/ATAPI bus, and
the interface circuit is an ATA/ATAPI interface circuit.

49. An interface control method, in an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller,
the data buffer storing data;
the system controller requesting the interface circuit to perform data transfer between the upstream device and the data-buffer; and
the interface control method comprising the steps of:
(a) requesting the host data transfer section to perform data transfer between the upstream device and the host data transfer section in accordance with the request from the system controller to perform data transfer between the upstream device and the data buffer;
(b) requesting the buffer data transfer section to perform data transfer between the data buffer and the buffer data transfer section in accordance with the request from the system controller to perform data transfer between the upstream device and the data buffer; and
(c) determining whether the data transfer between the upstream device and the data buffer has been completed or not based on a report from the host data transfer section on the data transfer and a report from the buffer data transfer section on the data transfer.

50. An interface control method according to claim 49, wherein:
the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer; and
when the data transfer between the upstream device and the host data transfer section has been completed and the data transfer between the data buffer and the buffer data transfer section has been completed, the data transfer between the upstream device and the data buffer is determined to have been completed.

51. An interface control method according to claim 49, wherein the host data transfer section performs data transfer with the upstream device via a bus.

52. An interface control method according to claim 51, wherein:
the bus is an ATA/ATAPI bus, and
the interface circuit is an ATA/ATAPI interface circuit.

53. An interface control method, in a disc controller including a disc recording and reproduction control section for performing data recording to and data reproduction from a disc, and an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller;
the data buffer storing data;
the system controller requesting the interface circuit to perform data transfer between the upstream device and the data buffer; and
the interface control method comprising the steps of:
(a) requesting the host data transfer section to perform data transfer between the upstream device and the host data transfer section in accordance with the request from the system controller to perform data transfer between the upstream device and the data buffer;
(b) requesting the buffer data transfer section to perform data transfer between the data buffer and the buffer data transfer section in accordance with the request from the system controller to perform data transfer between the upstream device and the data buffer; and
(c) determining whether the data transfer between the upstream device and the data buffer has been completed or not based on a report from the host data transfer section on the data transfer and a report from the buffer data transfer section on the data transfer.

54. An interface control method according to claim 53, wherein:
the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer; and
when the data transfer between the upstream device and the host data transfer section has been completed and the data transfer between the data buffer and the buffer data transfer section has been completed, the data transfer between the upstream device and the data buffer is determined to have been completed.

55. An interface control method according to claim 53, wherein the host data transfer section performs data transfer with the upstream device via a bus.

56. An interface control method according to claim 55, wherein:
the bus is an ATA/ATAPI bus, and the interface circuit is an ATA/ATAPI interface circuit.

57. An interface control method, in a disc drive apparatus including an interface circuit for performing communication with an upstream device and with a system controller, a data buffer capable of storing data, and the system controller, for controlling a host data transfer section for performing data transfer with the upstream device, a buffer data transfer section for performing data transfer with the data buffer, and a system interface communication section for performing communication with the system controller;
the system controller requesting the interface circuit to perform data transfer between the upstream device and the data buffer; and
the interface control method comprising the steps of:
(a) requesting data transfer between the upstream device and the data buffer;
(b) requesting the host data transfer section to perform data transfer between the upstream device and the host data transfer section in accordance with the request from the system controller to perform data transfer between the upstream device and the data buffer;
(c) requesting the buffer data transfer section to perform data transfer between the data buffer and the buffer data transfer section in accordance with the request from the system controller to perform data transfer between the upstream device and the data buffer; and
(d) determining whether the data transfer between the upstream device and the data buffer has been completed or not based on a report from the host data transfer section on the data transfer and a report from the buffer data transfer section on the data transfer.

58. An interface control method according to claim 57, wherein:
the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer; and
when the data transfer between the upstream device and the host data transfer section has been completed and the data transfer between the data buffer and the buffer data transfer section has been completed, the data transfer between the upstream device and the data buffer is determined to have been completed.

59. An interface control method according to claim 57, wherein the host data transfer section performs data transfer with the upstream device via a bus.

60. An interface control method according to claim 59, wherein:
the bus is an ATA/ATAPI bus, and
the interface circuit is an ATA/ATAPI interface circuit.

61. An interface control method, in a disc drive apparatus including a disc controller, a data buffer capable of storing data, and a system controller, for controlling a host data transfer section for performing data transfer with the upstream device, and a buffer data transfer section for performing data transfer with the data buffer;
the disc controller including:
a disc recording and reproduction control section for performing data recording to and data reproduction from a disc; and
an interface circuit for performing communication with the upstream device and the system controller;
the system controller requesting the interface circuit to perform data transfer between the upstream device and the data buffer; and
the interface control method comprising the steps of:
(a) requesting data transfer between the upstream device and the data buffer;
(b) requesting the host data transfer section to perform data transfer between the upstream device and the host data transfer section in accordance with the request from the system controller to perform data transfer between the upstream device and the data buffer;
(c) requesting the buffer data transfer section to perform data transfer between the data buffer and the buffer data transfer section in accordance with the request from the system controller to perform data transfer between the upstream device and the data buffer; and
(d) determining whether the data transfer between the upstream device and the data buffer has been completed or not based on a report from the host data transfer section on the data transfer and a report from the buffer data transfer section on the data transfer.

62. An interface control method according to claim 61, wherein:
the step of determining includes the steps of: determining whether the data transfer between the upstream device and the host data transfer section has been completed or not based on a report from the host data transfer section on the data transfer, and determining whether the data transfer between the data buffer and the buffer data transfer section has been completed or not based on a report from the buffer data transfer section on the data transfer; and
when the data transfer between the upstream device and the host data transfer section has been completed and the data transfer between the data buffer and the buffer data transfer section has been completed, the data transfer between the upstream device and the data buffer is determined to have been completed.

63. An interface control method according to claim 61, wherein the host data transfer section performs data transfer with the upstream device via a bus.

64. An interface control method according to claim 63, wherein:
the bus is an ATA/ATAPI bus, and
the interface circuit is an ATA/ATAPI interface circuit.

65. An interface circuit for performing communication with an upstream device and with a system controller for controlling a disc drive apparatus, the interface circuit comprising:
a host data transfer section for performing data transfer with the upstream device;
a buffer data transfer section for performing data transfer with a data buffer;
a system interface communication section for performing communication with the system controller; and an interface control section for controlling the host data transfer section, the buffer data transfer section, and the system interface communication section;

wherein:

the data buffer stores data;

the system controller requests the interface circuit to update the data stored in the data buffer and transfer the updated data to the upstream device; and the interface control section includes:

(a) a first request section for updating the data stored in the data buffer in accordance with the request from the system controller to update the data;

(b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

66. An interface circuit according to claim 65, wherein the host data transfer section performs data transfer with the upstream device via a bus.

67. An interface circuit according to claim 66, wherein the data stored in the data buffer is device information data requested by the upstream device for identifying a device connected to the bus.

68. An interface circuit according to claim 66, wherein:

the bus is an ATA/ATAPI bus, and the interface circuit is an ATA/ATAPI interface circuit.

69. A disc controller, comprising:

a disc recording and reproduction control section for performing data recording to and data reproduction from a disc; and an interface circuit for performing communication with an upstream device and with a system controller for controlling a disc drive apparatus;

wherein the interface circuit includes:

a host data transfer section for performing data transfer with the upstream device;

a buffer data transfer section for performing data transfer with a data buffer;

a system interface communication section for performing communication with the system controller; and an interface control section for controlling the host data transfer section, the buffer data transfer section, and the system interface communication section;

wherein:

the data buffer stores data;

the system controller requests the interface circuit to update the data stored in the data buffer and transfer the updated data to the upstream device; and the interface control section includes:

(a) a first request section for updating the data stored in the data buffer in accordance with the request from the system controller to update the data;

(b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

70. A disc controller according to claim 69, wherein the host data transfer section performs data transfer with the upstream device via a bus.

71. A disc controller according to claim 70, wherein the data stored in the data buffer is device information data requested by the upstream device for identifying a device connected to the bus.

72. A disc controller according to claim 70, wherein:

the bus is an ATA/ATAPI bus, and the interface circuit is an ATA/ATAPI interface circuit.

73. A disc drive apparatus, comprising:

an interface circuit for performing communication with an upstream device and with a system controller;

a data buffer capable of storing data; and the system controller;

wherein the interface circuit includes:

a host data transfer section for performing data transfer with the upstream device;

a buffer data transfer section for performing data transfer with the data buffer;

a system interface communication section for performing communication with the system controller; and an interface control section for controlling the host data transfer section, the buffer data transfer section, and the system interface communication section;

wherein:

the system controller requests the interface circuit to update the data stored in the data buffer and transfer the updated data to the upstream device; and the interface control section includes:

(a) a first request section for updating the data stored in the data buffer in accordance with the request from the system controller to update the data;

(b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

74. A disc drive apparatus according to claim 73, wherein the host data transfer section performs data transfer with the upstream device via a bus.

75. A disc drive apparatus according to claim 74, wherein the data stored in the data buffer is device information data requested by the upstream device for identifying a device connected to the bus.

76. A disc drive apparatus according to claim 74, wherein:

the bus is an ATA/ATAPI bus, and the interface circuit is an ATA/ATAPI interface circuit.

77. A disc drive apparatus, comprising:

a disc controller;

a data buffer capable of storing data; and a system controller;

wherein the disc controller includes:

a disc recording and reproduction control section for performing data recording to and data reproduction from a disc; and an interface circuit for performing communication with an upstream device and with a system controller;

wherein the interface circuit includes:

a host data transfer section for performing data transfer with the upstream device;

a buffer data transfer section for performing data transfer with the data buffer;

a system interface communication section for performing communication with the system controller; and an interface control section for controlling the host data transfer section, the buffer data transfer section, and the system interface communication section;

wherein:

the system controller requests the interface circuit to update the data stored in the data buffer and transfer the updated data to the upstream device; and the interface control section includes:

(a) a first request section for updating the data stored in the data buffer in accordance with the request from the system controller to update the data;

(b) a second request section for requesting the system interface communication section to report to the system controller that the update of the data has been completed; and (c) a third request section for requesting the host data transfer section and the buffer data transfer section to transfer the updated data in accordance with the request from the system controller to transfer the updated data to the upstream device.

78. A disc drive apparatus according to claim 77, wherein the host data transfer section performs data transfer with the upstream device via a bus.

79. A disc drive apparatus according to claim 78, wherein the data stored in the data buffer is device information data requested by the upstream device for identifying a device connected to the bus.

80. A disc drive apparatus according to claim 78, wherein:

the bus is an ATA/ATAPI bus, and the interface circuit is an ATA/ATAPI interface circuit.

81. An interface control method, in an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller;

the data buffer storing data;

the system controller requesting the interface circuit to update the data stored in the data buffer and transfer the updated data to the upstream device; and the interface control method comprising the steps of:

(a) updating the data stored in the data buffer in accordance with the request from the system controller to update the data;

(b) requesting the system interface communication section to report to the system controller that the update of the data has been completed; and (c) requesting the host data transfer section and the buffer data transfer section to transfer the updated data in accordance with the request from the system controller to transfer the updated data to the upstream device.

82. An interface control method according to claim 81, wherein the host data transfer section performs data transfer with the upstream device via a bus.

83. An interface control method according to claim 82, wherein the data stored in the data buffer is device information data requested by the upstream device for identifying a device connected to the bus.

84. An interface control method according to claim 82, wherein:

the bus is an ATA/ATAPI bus, and the interface circuit is an ATA/ATAPI interface circuit.

85. An interface control method, in a disc controller including a disc recording and reproduction control section for performing data recording to and data reproduction from a disc, and an interface circuit for performing communication with an upstream device and with a system controller for controlling a disc drive apparatus, for controlling a host data transfer section for performing data transfer with the upstream device, a buffer data transfer section for performing data transfer with a data buffer, and a system interface communication section for performing communication with the system controller;

the data buffer storing data;

the system controller requesting the interface circuit to update the data stored in the data buffer and transfer the updated data to the upstream device; and the interface control method comprising the steps of:

(a) updating the data stored in the data buffer in accordance with the request from the system controller to update the data;

(b) requesting the system interface communication section to report to the system controller that the update of the data has been completed; and (c) requesting the host data transfer section and the buffer data transfer section to transfer the updated data in accordance with the request from the system controller to transfer the updated data to the upstream device.

86. An interface control method according to claim 85, wherein the host data transfer section performs data transfer with the upstream device via a bus.

87. An interface control method according to claim 86, wherein the data stored in the data buffer is device information data requested by the upstream device for identifying a device connected to the bus.

88. An interface control method according to claim 86, wherein:

the bus is an ATA/ATAPI bus, and the interface circuit is an ATA/ATAPI interface circuit.

89. An interface control method, in a disc drive apparatus including an interface circuit for performing communication with an upstream device and with a system controller, a data buffer capable of storing data, and the system controller, for controlling a host data transfer section for performing data transfer with the upstream device, a buffer data transfer section for performing data transfer with the data buffer, and a system interface communication section for performing communication with the system controller;

the system controller requesting the interface circuit to update the data stored in the data buffer and transfer the updated data to the upstream device; and the interface control method comprising the steps of:

(a) requesting the interface circuit to update the data stored in the data buffer;

(b) updating the data stored in the data buffer in accordance with the request from the system controller to update the data;

(c) requesting the system interface communication section to report to the system controller that the update of the data has been completed;

(d) requesting the interface circuit to transfer the updated data to the upstream device; and (e) requesting the host data transfer section and the buffer data transfer section to transfer the updated data in accordance with the request from the system controller to transfer the updated data to the upstream device.

90. An interface control method according to claim 89, wherein the host data transfer section performs data transfer with the upstream device via a bus.

91. An interface control method according to claim 90, wherein the data stored in the data buffer is device information data requested by the upstream device for identifying a device connected to the bus.

92. An interface control method according to claim 90, wherein:
the bus is an ATA/ATAPI bus, and
the interface circuit is an ATA/ATAPI interface circuit.

93. An interface control method, in a disc drive apparatus including a disc controller, a data buffer capable of storing data, and a system controller, for controlling a host data transfer section for performing data transfer with the upstream device, a buffer data transfer section for performing data transfer with the data buffer, and a system interface communication section for performing communication with the system controller;
the disc controller including:
a disc recording and reproduction control section for performing data recording to and data reproduction from a disc; and
an interface circuit for performing communication with an upstream device and with the system controller;
the system controller requesting the interface circuit to update the data stored in the data buffer and transfer the updated data to the upstream device; and
the interface control method comprising the steps of:
(a) requesting the interface circuit to update the data stored in the data buffer;
(b) updating the data stored in the data buffer in accordance with the request from the system controller to update the data;
(c) requesting the system interface communication section to report to the system controller that the update of the data has been completed;
(d) requesting the interface circuit to transfer the updated data to the upstream device; and
(e) requesting the host data transfer section and the buffer data transfer section to transfer the updated data to the upstream device in accordance with the request from the system controller to transfer the updated data to the upstream device.

94. An interface control method according to claim 93, wherein the host data transfer section performs data transfer with the upstream device via a bus.

95. An interface control method according to claim 94, wherein the data stored in the data buffer is device information data requested by the upstream device for identifying a device connected to the bus.

96. An interface control method according to claim 94, wherein:
the bus is an ATA/ATAPI bus, and
the interface circuit is an ATA/ATAPI interface circuit.

97. An ATA/ATAPI interface circuit for performing communication with an upstream device and with a system controller for controlling a disc drive apparatus which is connected to an ATA/ATAPI bus as a master device, the ATA/ATAPI interface circuit comprising:
an ATA task file register for performing communication with the upstream device;
a system interface communication section for performing communication with the system controller;
a pseudo task file register operating instead of an ATA task file register included in a slave device corresponding to the master device; and
an interface control section for controlling the ATA task file register, the interface communication section, and the pseudo task file register;
wherein:
the upstream device is connected to the ATA/ATAPI bus;
the system controller reports operation method information to the ATA/ATAPI interface circuit;
the operation method information represents an operation performed by the master device when the upstream device attempts to access the slave device in a state where the slave device is not connected to the ATA/ATAPI bus; and
the interface control section includes:
(a) a request section for requesting the system interface communication section to receive the operation method information reported by the system controller; and
(b) a setting section for setting a value to be held by the pseudo task file register based on the operation method information;
wherein the value is a value regarding the operation method information.

98. A disc controller, comprising:
a disc recording and reproduction control section for performing data recording to and data reproduction from a disc; and
an ATA/ATAPI interface circuit for performing communication with an upstream device and with a system controller for controlling a disc drive apparatus which is connected to an ATA/ATAPI bus as a master device,
wherein the ATA/ATAPI interface circuit includes:
an ATA task file register for performing communication with the upstream device;
a system interface communication section for performing communication with the system controller;
a pseudo task file register operating instead of an ATA task file register included in a slave device corresponding to the master device; and
an interface control section for controlling the ATA task file register, the system interface communication section, and the pseudo task file register;
wherein:
the upstream device is connected to the ATA/ATAPI bus;
the system controller reports operation method information to the ATA/ATAPI interface circuit;
the operation method information represents an operation performed by the master device when the upstream device attempts to access the slave device in a state where the slave device is not connected to the ATA/ATAPI bus; and
the interface control section includes:
(a) a request section for requesting the system interface communication section to receive the operation method information reported by the system controller; and
(b) a setting section for setting a value to be held by the pseudo task file register based on the operation method information;
wherein the value is a value regarding the operation method information.

99. A disc drive apparatus, comprising:
an ATA/ATAPI interface circuit for performing communication with an upstream device and with a system controller; and
the system controller;
wherein:
the disc drive apparatus is connected to an ATA/ATAPI bus as a master device; and
the ATA/ATAPI interface circuit includes:
an ATA task file register for performing communication with the upstream device;

a system interface communication section for performing communication with the system controller;

a pseudo task file register operating instead of an ATA task file register included in a slave device corresponding to the master device; and an interface control section for controlling the ATA task file register, the system interface communication section, and the pseudo task file register;

wherein:

the upstream device is connected to the ATA/ATAPI bus;

the system controller reports operation method information to the ATA/ATAPI interface circuit;

the operation method information represents an operation performed by the master device when the upstream device attempts to access the slave device in a state where the slave device is not connected to the ATA/ATAPI bus; and the interface control section includes:

(a) a request section for requesting the system interface communication section to receive the operation method information reported by the system controller; and (b) a setting section for setting a value to be held by the pseudo task file register based on the operation method information;

wherein the value is a value regarding the operation method information.

100. A disc drive apparatus, comprising:

a disc controller; and a system controller;

wherein the disc controller includes:

a disc recording and reproduction control section for performing data recording to and data reproduction from a disc; and an ATA/ATAPI interface circuit for performing communication with an upstream device and with a system controller;

wherein:

the disc drive apparatus is connected to an ATA/ATAPI bus as a master device; and the ATA/ATAPI interface circuit includes:

an ATA task file register for performing communication with the upstream device;

a system interface communication section for performing communication with the system controller;

a pseudo task file register operating instead of an ATA task file register included in a slave device corresponding to the master device; and an interface control section for controlling the ATA task file register, the system interface communication section, and the pseudo task file register;

wherein:

the upstream device is connected to the ATA/ATAPI bus;

the system controller reports operation method information to the ATA/ATAPI interface circuit;

the operation method information represents an operation performed by the master device when the upstream device attempts to access the slave device in a state where the slave device is not connected to the ATA/ATAPI bus; and the interface control section includes:

(a) a request section for requesting the system controller interface section to receive the operation method information reported by the system controller; and (b) a setting section for setting a value to be held by the pseudo task file register based on the operation method information;

wherein the value is a value regarding the operation method information.

101. An interface control method, in an ATA/ATAPI interface circuit for performing communication with an upstream device and with a system controller for controlling a disc drive apparatus which is connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device;

the upstream device being connected to the ATA/ATAPI bus;

the system controller reporting operation method information to the ATA/ATAPI interface circuit;

the operation method information representing an operation performed by the master device when the upstream device attempts to access the slave device in a state where the slave device is not connected to the ATA/ATAPI bus; and the interface control method comprising the steps of:

(a) requesting the system interface communication section to receive the operation method information reported by the system controller; and (b) setting a value to be held by the pseudo task file register based on the operation method information;

wherein the value is a value regarding the operation method information.

102. An interface control method, in a disc controller including a disc recording and reproduction control section for performing data recording to and data reproduction from a disc, and an ATA/ATAPI interface circuit for performing communication with an upstream device and with a system controller for controlling a disc drive apparatus which is connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device;

the upstream device being connected to the ATA/ATAPI bus;

the system controller reporting operation method information to the ATA/ATAPI interface circuit;

the operation method information representing an operation performed by the master device when the upstream device attempts to access the slave device in a state where the slave device is not connected to the ATA/ATAPI bus; and the interface control method comprising the steps of:

(a) requesting the system interface communication section to receive the operation method information reported by the system controller; and (b) setting a value to be held by the pseudo task file register based on the operation method information;

wherein the value is a value regarding the operation method information.

103. An interface control method, in a disc drive apparatus including an ATA/ATAPI interface circuit for performing communication with an upstream device and with a system controller, and the system controller, the disc drive apparatus being connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device;

the upstream device being connected to the ATA/ATAPI bus;
the system controller reporting operation method information to the ATA/ATAPI interface circuit;
the operation method information representing an operation performed by the master device when the upstream device attempts to access the slave device in a state where the slave device is not connected to the ATA/ATAPI bus; and
the interface control method comprising the steps of:
(a) reporting the operation method information to the ATA/ATAPI interface circuit;
(b) requesting the system interface communication section to receive the operation method information reported by the system controller; and
(c) setting a value to be held by the pseudo task file register based on the operation method information;
wherein the value is a value regarding the operation method information.

104. An interface control method, in a disc drive apparatus including a disc controller and a system controller, the disc drive apparatus being connected to an ATA/ATAPI bus as a master device, for controlling an ATA task file register for performing communication with the upstream device, a system interface communication section for performing communication with the system controller, and a pseudo task file register operating instead of an ATA task file register included in a slave device corresponding to the master device;

the disc controller including:
a disc recording and reproduction control section for performing data recording to and data reproduction from a disc; and
an ATA/ATAPI interface circuit for performing communication with an upstream device and with a system controller;
the upstream device being connected to the ATA/ATAPI bus;
the system controller reporting operation method information to the ATA/ATAPI interface circuit;
the operation method information representing an operation performed by the master device when the upstream device attempts to access the slave device in a state where the slave device is not connected to the ATA/ATAPI bus; and
the interface control method comprising the steps of:
(a) reporting the operation method information to the ATA/ATAPI interface circuit;
(b) requesting the system interface communication section to receive the operation method information reported by the system controller; and
(c) setting a value to be held by the pseudo task file register based on the operation method information;
wherein the value is a value regarding the operation method information.

\* \* \* \* \*